United States Patent
Horiuchi

(10) Patent No.: US 7,788,527 B2
(45) Date of Patent: Aug. 31, 2010

(54) STORAGE SYSTEM AND STORAGE SYSTEM MANAGEMENT METHOD

(75) Inventor: Takashi Horiuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 408 days.

(21) Appl. No.: 11/968,325

(22) Filed: Jan. 2, 2008

(65) Prior Publication Data

US 2008/0301493 A1    Dec. 4, 2008

(30) Foreign Application Priority Data

May 28, 2007    (JP) .............................. 2007-140784

(51) Int. Cl.
*G06F 11/00* (2006.01)
(52) U.S. Cl. .............................. 714/6; 714/15; 711/162
(58) Field of Classification Search ...................... 714/6, 714/15; 711/162
See application file for complete search history.

(56) References Cited

U.S. PATENT DOCUMENTS

| 7,111,136 | B2* | 9/2006 | Yamagami | 711/162 |
| 7,698,503 | B2* | 4/2010 | Okada et al. | 711/115 |
| 2004/0107226 | A1* | 6/2004 | Autrey et al. | 707/204 |
| 2005/0188253 | A1* | 8/2005 | Kawamura et al. | 714/6 |
| 2005/0192991 | A1* | 9/2005 | Nomoto et al. | 707/101 |
| 2005/0193244 | A1* | 9/2005 | Stager et al. | 714/12 |
| 2005/0216536 | A1* | 9/2005 | Stager et al. | 707/204 |
| 2005/0267916 | A1* | 12/2005 | Tone et al. | 707/200 |
| 2006/0004879 | A1* | 1/2006 | Tone | 707/200 |
| 2006/0010300 | A1* | 1/2006 | Arakawa et al. | 711/162 |
| 2006/0129877 | A1* | 6/2006 | Yamamoto et al. | 714/6 |
| 2006/0195493 | A1* | 8/2006 | Chang et al. | 707/204 |
| 2006/0242373 | A1* | 10/2006 | Hirakawa et al. | 711/162 |
| 2006/0259722 | A1* | 11/2006 | Watanabe | 711/162 |
| 2007/0156985 | A1* | 7/2007 | Tsai et al. | 711/162 |
| 2007/0162513 | A1* | 7/2007 | Lewin et al. | 707/200 |

FOREIGN PATENT DOCUMENTS

JP    2005-018738    1/2005

* cited by examiner

*Primary Examiner*—Scott T Baderman
*Assistant Examiner*—Chae Ko
(74) *Attorney, Agent, or Firm*—Brundidge & Stanger, P.C.

(57) ABSTRACT

A management server in a storage system manages a table that stores, as a change history, at least configuration change and a change time for plural volumes; acquires specification of a recovery-target volume and of a recovery time, and acquires, from the table, information on the specified volume and the specified recovery time; shows, in a user interface, a point of difference between a current configuration of the specified volume and a configuration of the specified volume as of at the specified time in a manner distinguishing it from the other parts in display based on the acquired information and current information on the specified volume; and recovers the specified volume to its state as of at the specified time based on backup data and journal data after acquisition of an instruction to recover the specified volume to its state as of at the specified time based on the display.

20 Claims, 21 Drawing Sheets

| VOLUME ID | VOLUME NAME | APPARATUS NUMBER | LOGICAL DEVICE NUMBER | USAGE STATUS | MAIN VOLUME ID |
|---|---|---|---|---|---|
| 1 | A | 1000 | 17C | in use | 0 |
| 2 | D | 1000 | 17D | unused | -1 |
| 3 | A10 | 1000 | 17E | in use | 1 |
| 4 | A11 | 2000 | 301 | in use | 3 |
| 5 | A12 | 2000 | 302 | in use | 3 |
| 6 | A11res | 2000 | 303 | reserved | -1 |
|  |  | 2000 | 304 | unused |  |

| PROCESSING TIME | PROCESSING CONTENT | VOLUME ID | |
|---|---|---|---|
| 422A | 422B | 422C | |
| 2007/2/28 5:00 | CP ACQUISITION | - | - |
| 2007/2/28 6:00 | vol CREATION | 1 | - |
| 2007/2/28 6:30 | vol CREATION | 2 | - |
| 2007/2/28 7:00 | vol CREATION | 3 | - |
| 2007/2/28 8:00 | PAIR CREATION | 1 | 3 |
| 2007/2/28 9:00 | SPLIT | 1 | 3 |
| 2007/2/28 9:30 | vol DELETION | 2 | - |
| 2007/2/28 9:45 | vol CREATION | 4 | - |
| 2007/2/28 10:00 | PAIR CREATION | 3 | 4 |
| 2007/2/28 11:00 | SPLIT | 3 | 4 |
| 2007/2/28 11:05 | PAIR CREATION | 1 | 3 |
| 2007/2/28 12:00 | SPLIT | 1 | 3 |
| 2007/2/28 12:30 | CP ACQUISITION | 1 | 3 |
| 2007/2/28 12:45 | vol CREATION | 5 | - |
| 2007/2/28 13:00 | PAIR CREATION | 3 | 5 |
| 2007/2/28 14:00 | SPLIT | 3 | 5 |
| 2007/2/28 14:05 | PAIR CREATION | 1 | 3 |
| 2007/2/28 15:00 | SPLIT | 1 | 3 |
| 2007/2/28 16:00 | PAIR CREATION | 3 | 4 |
| 2007/2/28 17:00 | SPLIT | 3 | 4 |
| 2007/2/28 17:05 | PAIR CREATION | 1 | 3 |
| 2007/2/28 18:00 | SPLIT | 1 | 3 |
| | | 422D | 422E |

FIG.5

| VOLUME ID | PRE-RECOVERY (CURRENT) | | POST-RECOVERY | |
|---|---|---|---|---|
| | PAIR STATUS | DATA STORAGE TIME | PAIR STATUS | DATA STORAGE TIME |
| 1 | - | 2007/2/28 18:25 | - | 2007/2/28 9:50 |
| 3 | split | 2007/2/28 18:00 | split | 2007/2/28 9:00 |
| - | | | | |
| - | | | | |
| 4 | split | 2007/2/28 15:00 | - | 2007/2/28 9:50 |
| 5 | split | 2007/2/28 12:00 | - | - |
| - | | | | |
| - | | | | |
| - | | | | |
| - | | | | |
| - | | | | |
| - | | | | |

FIG.6

| VOLUME ID | PRE-RECOVERY (CURRENT) | | POST-RECOVERY | |
|---|---|---|---|---|
| | PAIR STATUS | DATA STORAGE TIME | PAIR STATUS | DATA STORAGE TIME |
| 1 | - | 2007/2/28 18:25 | - | 2007/2/28 12:00 |
| 3 | split | 2007/2/28 18:00 | split | 2007/2/28 12:00 |
| - | | | | |
| - | | | | |
| 4 | split | 2007/2/28 15:00 | split | 2007/2/28 9:00 |
| 5 | split | 2007/2/28 12:00 | - | - |
| - | | | | |
| - | | | | |
| - | | | | |
| - | | | | |
| - | | | | |
| - | | | | |

FIG.7

| VOLUME ID | PRE-RECOVERY (CURRENT) | | POST-RECOVERY | |
|---|---|---|---|---|
| | PAIR STATUS | DATA STORAGE TIME | PAIR STATUS | DATA STORAGE TIME |
| 1 | - | 2007/2/28 18:25 | - | 2007/2/28 14:30 |
| 3 | split | 2007/2/28 18:00 | split | 2007/2/28 18:00 |
| - | | | | |
| - | | | | |
| 4 | split | 2007/2/28 15:00 | split | 2007/2/28 15:00 |
| 5 | split | 2007/2/28 12:00 | split | 2007/2/28 12:00 |
| - | | | | |
| - | | | | |
| - | | | | |
| - | | | | |
| - | | | | |
| - | | | | |

FIG.8

| VOLUME ID | PRE-RECOVERY (CURRENT) | | POST-RECOVERY | |
|---|---|---|---|---|
| | PAIR STATUS | DATA STORAGE TIME | PAIR STATUS | DATA STORAGE TIME |
| 1 | - | 2007/2/28 18:25 | - | 2007/2/28 16:30 |
| 3 | split | 2007/2/28 18:00 | split | 2007/2/28 15:00 |
| - | | | | |
| - | | | | |
| 4 | split | 2007/2/28 15:00 | split | 2007/2/28 9:00 |
| 5 | split | 2007/2/28 12:00 | split | 2007/2/28 12:00 |
| - | | | | |
| - | | | | |
| - | | | | |
| - | | | | |
| - | | | | |

| STORAGE SOURCE VOLUME ID (427A) | STORAGE DESTINATION VOLUME ID (427B) |
|---|---|
| 4 | 4 |
| 4 | 6 |

| NUMBER OF ENTRIES (428A) | TYPE OF CHANGE (428B) | VOLUME ID (428C) | TYPE OF CHANGE (428D) | VOLUME ID (428E) | TYPE OF CHANGE (428F) | VOLUME ID (428G) |
|---|---|---|---|---|---|---|
| 3 | PAIR RELEASE | 3, 4 | PAIR RELEASE | 3, 5 | VOLUME DELETION | 5 |

# STORAGE SYSTEM AND STORAGE SYSTEM MANAGEMENT METHOD

CROSS-REFERENCES TO RELATED APPLICATIONS

This application relates to and claims priority from Japanese Patent Application No. 2007-140784, filed on May 28, 2007, the entire disclosure of which is incorporated herein by reference.

BACKGROUND

1. Field of the Invention

The invention relates to a storage system and a storage system management method, and is suitable for use in, for example, management conducted for recovering a volume in a storage system.

2. Description of Related Art

Configuration change made after the acquisition of volume backup (for example, where a sub volume for a volume, which has acquired backup, is created via pair configuration) has not been considered when recovering a volume in a storage system to its correct state as of at a point in time after the discovery of virus infection, disk failure, user operation error, etc.

In recovering data from backup data, the only way for recovery was a user manually conducting configuration recovery work in which configuration is recovered to its state as of at a backup time; backup data is restored; and journal data is applied to the resultant data while configuration change is reproduced.

Incidentally, regarding a technique in a storage system that recovers data by using journal data, a storage system is known in which a journal of a plurality of journal entries and at least one snapshot of one or more data volumes is maintained; a unique sequence number is assigned to each journal and snapshot in order of generation, which makes it easy to find a journal to be applied to a snapshot, recovering a journal space (refer to, e.g., JP2005-018738 A).

However, in data recovery, it has been impossible for, when a user specifies a data recovery time and a configuration recovery time, the difference in data and volume configuration between the state as of at the specified time and the current state to be shown to the user. Since it has been impossible for the difference to be shown to a user as state above, it has been not easy for the user to decide which data or volume configuration is recovered. As a result, the user operation for recovering data and volume configuration has not been easy. Also, recovery processing is manually conducted by a user, and so a storage system cannot automatically execute recovery processing. Therefore, recovery processing has required a lot of time.

SUMMARY

The present invention has been made in light of the above, and an object of the invention is to propose a storage system and a storage system management method that enable easy recovery operation by a user and reduction in recovery processing time when recovering at least either data or volume configuration in the storage system.

According to the invention, provided is a storage system, including: a host; a storage apparatus having plural volumes that store data written from the host and plural volumes that store journal data for the data; a management server that manages the storage apparatus; and a backup apparatus that backs up the data written to the storage apparatus, characterized in that the management server includes: a table that stores, as a change history, at least configuration change and a change time for the plural volumes; a management unit that manages the change history stored in the table; a first acquisition unit that acquires specification of a recovery-target volume and specification of a recovery time; a second acquisition unit that acquires, from the table, information on the specified volume and the specified recovery time after acquisition of the specification of the recovery-target volume and the specification of the recovery time by the first acquisition unit; a display unit that shows a point of difference between the current configuration of the specified volume and the configuration of the specified volume as of at the specified time in a manner distinguishing it from the other parts in display based on the information acquired by the second acquisition unit and current information on the specified volume; and a recovery control unit that recovers the specified volume to its state as of at the specified time based on the data backed up in the backup apparatus and the journal data after acquisition of an instruction to recover the specified volume to its state as of at the specified time based on the display of the display unit.

More specifically, in a storage system including: a host; a storage apparatus having plural volumes that store data written from the host and plural volumes that store journal data for the data; a management server that manages the storage apparatus; and a backup apparatus that backs up the data written to the storage apparatus, a table, which stores, as a change history, at least configuration change and a change time for the plural volumes, is managed; specification of a recovery-target volume and specification of a recovery time are acquired; information on the specified volume and the specified recovery time is acquired from the table; a point of difference between the current configuration of the specified volume and the configuration of the specified volume as of at the specified time is shown in a manner distinguishing it from the other parts in display based on the information acquired by the second acquisition unit and current information on the specified volume; and the specified volume is recovered to its state as of at the specified time based on the data backed up in the backup apparatus and the journal data after acquisition of an instruction to recover the specified volume to its state as of at the specified time based on the display. Accordingly, in recovering data and volume configuration in the storage system, recovery operation can be easily conducted by a user, and also, a recovery processing time can be shortened by automatically executing recovery processing.

According to the invention, a storage system can be provided which realizes easy recovery operation by a user and reduction in time for recovery processing via automatic execution of recovery processing when recovering data and volume configuration in the storage system. Also, according to the invention, the time at which data held by a post-recovery volume is stored (which data in terms of time is held by a volume) and a volume configuration are displayed via a GUI, and execution of recovery processing can be determined after confirming the post-recovery storage state. Accordingly, a storage system that can prevent errors in recovery processing can be provided.

BRIEF DESCRIPTION OF THE DRAWINGS

FIG. 4 is a diagram showing a configuration change history table according to the invention.

FIG. 5 is a diagram showing a configuration display table according to the invention.

FIG. 6 is a diagram showing a configuration display table according to the invention.

FIG. 7 is a diagram showing a configuration display table according to the invention.

FIG. 8 is a diagram showing a configuration display table according to the invention.

FIG. 9 is a diagram showing a data storage destination table according to the invention.

FIG. 10 is a diagram showing configuration change notification information according to the invention.

DETAILED DESCRIPTION OF PREFERRED EMBODIMENTS

An embodiment of the present invention will be described in detail below with reference to the accompanying drawings. Note that the invention is not limited to the embodiment described below.

Figure 1:
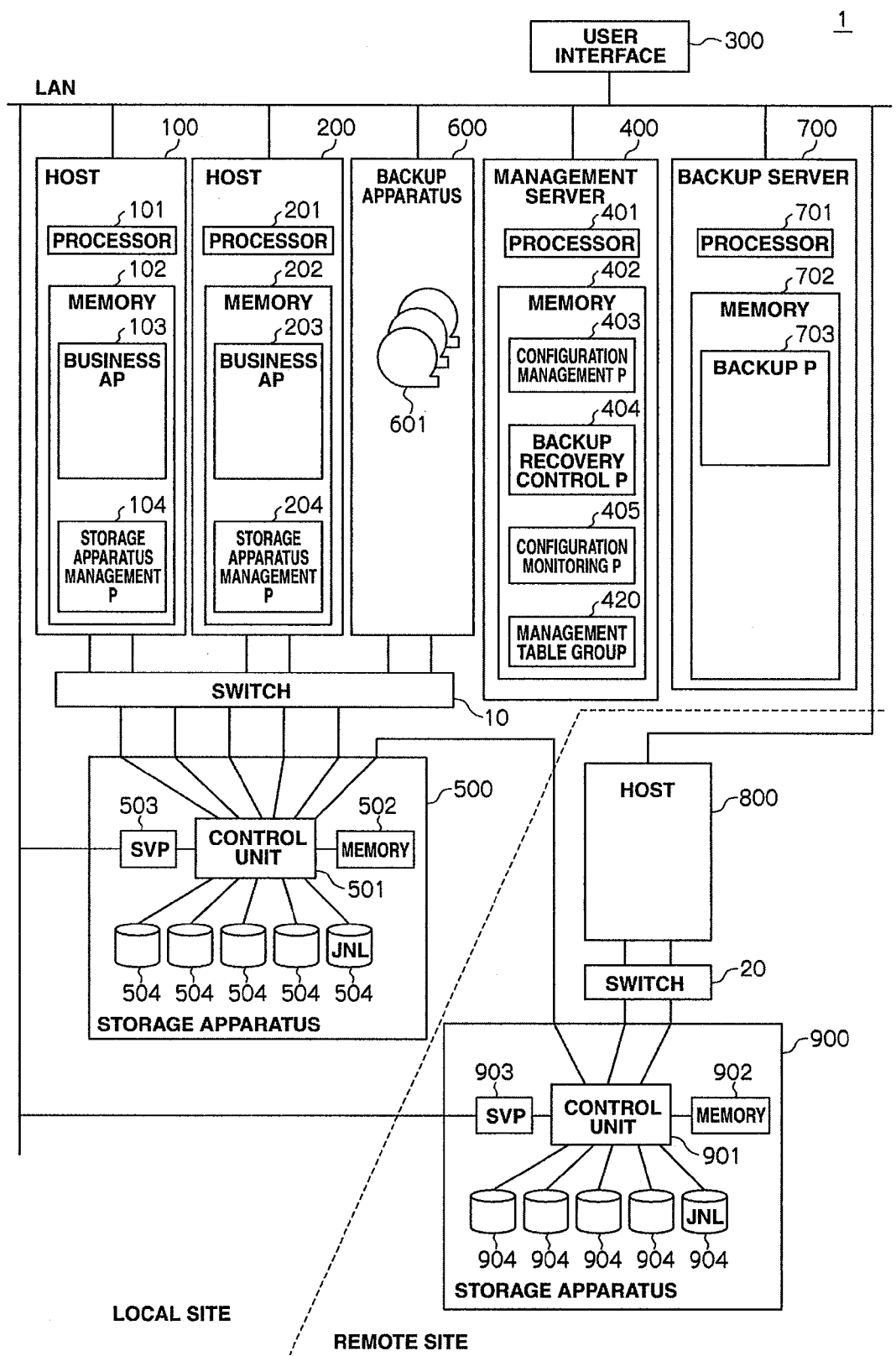
FIG. 1 is a diagram showing an overall configuration for a storage system according to the invention.

FIG. 1 is a diagram showing an overall configuration for a storage system 1. The storage system 1 includes hosts 100 and 200, a user interface 300, a management server 400, a storage apparatus 500, a backup apparatus 600, a backup server 700, a host 800, and a storage apparatus 900.

The hosts 100 and 200, the user interface 300, the management server 400, the storage apparatus 500, the backup apparatus 600, the backup server 700, the host 800, and the storage apparatus 900 are connected to one another via a LAN. The hosts 100 and 200 and the backup apparatus 600 are connected to the storage apparatus 500 via a switch 10, and the host 800 is connected to the storage apparatus 900 via a switch 20. Also, the hosts 100 and 200, the user interface 300, the management server 400, the storage apparatus 500, the backup apparatus 600, and the backup server 700 are provided at a local site, while the host 800 and the storage apparatus 900 are provided at a remote site.

The storage system 1 is configured so that the data written in the storage apparatus 500 provided at the local site is copied to the storage apparatus 900 provided at the remote site synchronously or non-synchronously. Note that the remote site may be, for example, a place separate from the local site in the same building, or may be a place remote from the local site.

The host 100 has a processor 101 and memory 102. The processor 101 executes programs stored in the memory 102, thereby controlling the host 100. The memory 102 stores a business application program (business AP) 103, a storage apparatus management program (storage apparatus management P) 104, etc. When the storage system 1 is utilized in, e.g., a credit-card company, the business application program 103 is an application program for executing processing, e.g., credit-card settlement processing. The storage apparatus management program 104 is a program for managing the storage apparatus 500.

Note that the host 200 at the local site has a processor 201 and memory 202. The memory 202 stores a business application program (business AP) 203 and a storage apparatus management program (storage apparatus management P) 204. The description of the processor 201, the memory 202, the business application program 203; and the storage apparatus management program 204 is omitted because it is similar to that for the host 100.

The host 800 at the remote site also has a processor and memory like the hosts 100 and 200 although the processor and the memory are not shown in the drawing. The memory stores a storage apparatus management program, etc.

The user interface 300 has a display unit and an input unit. The display unit is, e.g., a display. The display unit displays, to a user, information for management of the storage system 1 by the management server 400. The input unit includes, e.g., a mouse and a keyboard. A user uses them to input information necessary for managing the storage system 1. Incidentally, in this embodiment, a configuration is employed in which the user interface 300 is connected to the management server 400 via the LAN; however, a configuration may be employed in which the management server 400 includes the user interface 300.

The management server 400 has a processor 401 and memory 402. The processor 401 executes various programs stored in the memory 402 by using various tables stored in the memory 402, thereby controlling the management server 400. The memory 402 stores a configuration management program (configuration management P) 403, a backup recovery control program (backup recovery control P) 404, and a configuration monitoring program (configuration monitoring P) 405, which are examples of the above various programs, and a management table group 420, which is an example of the above various tables.

The switch 10 is a fiber channel switch. The hosts 100 and 200 write/read data to/from the storage apparatus 500 via the switch 10.

The storage apparatus 500 has a control unit 501, memory 502, a service processor (SVP) 503, and plural volumes 504. The controller unit 501 executes a program stored in the memory 502, controlling the storage apparatus 500. The memory 502 stores a program for having the controller unit 501 control the storage apparatus 500. The service processor 503 is used for maintenance of the storage apparatus 500. The plural volumes 504 store data written by the hosts 100 and 200. Note that one of the volumes 504 stores journal data for the data written to the storage apparatus 500.

Incidentally, the storage apparatus 900 has the same configuration as the storage apparatus 500. More specifically, the storage apparatus 900 has a control unit 901, memory 902, an SVP 903, and plural volumes 904. A description of those components is omitted since it is substantially the same as for the storage apparatus 500.

The backup apparatus 600 has plural tapes 601, and backs up the data written to the storage apparatus 500 from the hosts 100 and 200.

The backup server 700 has a processor 701 and memory 702. The processor 701 executes a program stored in the memory 702, thereby controlling the backup server 700. The memory 702 stores a backup program (backup P) 703. The processor 701 executes the backup program 703, thereby controlling the backup apparatus 600. Then, backup for the data written to the storage apparatus 500 from the hosts 100 and 120 and the journal data stored in the volumes 504 is executed.

Figures 2, 3:
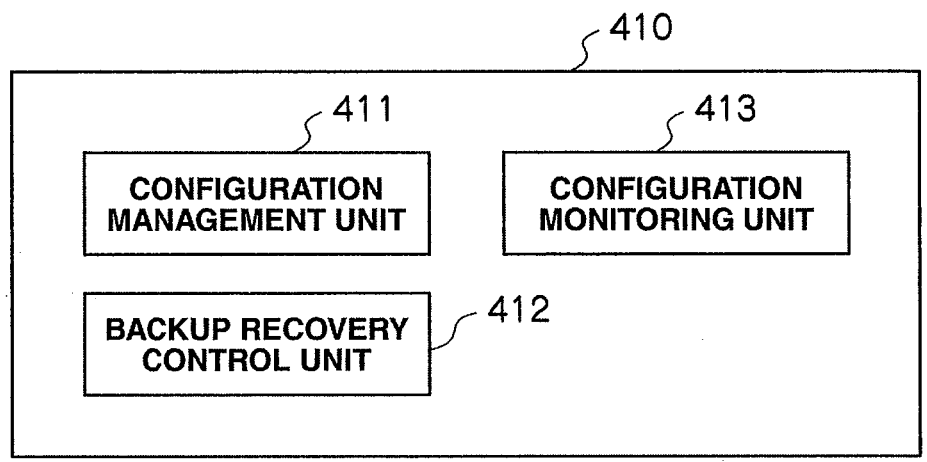
FIG. 2 is a functional block diagram in a management server according to the invention.
FIG. 3 is a diagram showing a volume management table according to the invention.

FIG. 2 is a functional block diagram of the management server 400. As shown in FIG. 2, the management server includes a configuration management unit 411, a backup recovery control unit 412, and a configuration monitoring unit 413. The configuration management unit 411 corresponds to a function realized by the processor 401 executing the configuration management program 403; the backup recovery control unit 412 corresponds to a function realized by the processor 401 executing the recovery control program; and the configuration monitoring unit 413 corresponds to a function realized by the processor 401 executing the configuration monitoring program 405.

FIG. 3 is a diagram showing a volume management table 421. The volume management table 421 is a table for managing the volumes 504 and 904 in the storage apparatuses 500 and 900, respectively. The volume management table 421 includes a volume ID column 421A, a volume name column 421B, an apparatus number column 421C, a logical device number column 421D, a usage status column 421E, and a main volume ID column 421F.

The volume ID column 421A is a column for storing a volume ID. The volume name column 421B is a column for storing a volume name. The apparatus number column 421C is a column for storing an apparatus number. The logical device number column 421D is a column for storing a logical device number. The usage status column 421E is a column for storing a volume usage status. The main volume ID column 421F is a column for storing a main volume ID.

The volume ID column 421A stores a numeric value of 1 or more for each volume when a volume is reserved or created. The volume name column 421B stores a volume name like "A", "D", "A10", "A11", "A12", or "A11res." The apparatus number column 421C stores an apparatus number like "1000" or "2000." The logical device number column 421D stores a logical device number like "17C", "17D", "17E", "301", "302", "303", or "304". The usage status column 421E stores "in use", "unused", or "reserved." The main volume ID column 421F stores "−1", "0", or a numeric value of 1 or more. "−1" means that the volume concerned is a single volume not included in a pair configuration. "0" means that the volume concerned is a root volume in a pair configuration. A numeric value of 1 or more means that the volume concerned is a sub volume and indicates a volume ID for the corresponding main volume.

As shown in FIG. 3, for, e.g., the row with "1" in the volume ID column 421A, the volume name column 421B stores "A" as the volume name; the apparatus number column 421C stores "1000" as the apparatus number; the logical device number column 421D stores "17C" as the logical device number; the usage status column 421E stores "in use" as the usage status; and the main volume ID column 421F stores "0" as the main volume ID.

FIG. 4 is a diagram showing a configuration change history table 422. The configuration change history table 422 is a table for storing the history of configuration change in the storage system 1. The configuration change history table 422 includes a processing time column 422A, a processing content column 422B, and a volume ID column 422C. The volume ID column 422C includes a first storage column 422D and a second storage column 422E.

The processing time column 422A is a column for storing a processing time. The processing content column 422B is a column for storing the processing content that has been subjected to configuration change. The volume ID column 422C is a column for storing a volume ID.

The processing time column 422A stores a date and a time. The processing content column 422B stores "CP acquisition", "vol creation", "vol deletion", "pair creation", "pair split", etc. "CP acquisition" means that the processing content was the acquisition of a checkpoint; "vol creation" means that the processing content was volume creation; "vol deletion" means that the processing content was volume deletion; "pair creation" means that the processing content was volume pair creation; and "pair split" means that the processing content was volume pair split. The volume ID column 422C stores a numeric value of 1 or more that is a volume ID. In the volume ID column 422C, a volume ID is stored in the first storage column 422D to specify a volume for the case of "vol creation" or "vol deletion", and a main volume ID and a sub volume ID are respectively stored in the first storage column 422D and the second storage column 422E to specify the volume IDs that constitute a pair when the processing content is "pair creation" or "pair split".

For example, as shown in FIG. 4, for the row with "2007/2/28 6:00" in the processing time column, the processing content column stores "vol creation" as processing content, and the first storage column in the volume ID column stores "1" as a volume ID. Also, for the row with "2007/2/28 8:00" in the processing time column, the processing content column stores "pair creation" as processing content; the first storage column in the volume ID column stores "1" as a main volume ID; and the second storage column stores "3" as a sub volume ID.

FIG. 5 is a diagram showing a configuration display table 423. The configuration display table 423 is a table used for, e.g., displaying a time configuration specified by a user on the user interface 300. The configuration display table 423 includes a volume ID column 423A, a pre-recovery (current) column 423B, and a post-recovery column 423C. Moreover, the pre-recovery (current) column 423B includes a pair status column 423D and a data storage time column 423E, and the post-recovery column 423C includes a pair status column 423F and a data storage time column 423G.

The volume ID column 423A is a column for storing a volume ID. The pair status column 423D is a column or storing a pre-recovery pair status. The data storage time column 423E is a column for storing a time for data held before recovery. The pair status column 423F is a column for storing a post-recovery pair status. The data storage time column 423G is a column for storing a time for data to be held after recovery.

The volume ID column 423A stores a numeric value of 1 or more as a volume ID. The pair status column 423D stores "-" or "split." "-" indicates a state where a pair has not been made, and "split" indicates a state where a pair of volumes has been made, but data copy between the volumes is not continuous. The data storage time column 423E stores data showing data and a time. Description of the data held in the pair status column 423F and the data storage time column 423G is omitted because it is the same as that of the data stored in the pair status column 423D and the data storage time column 423E.

As shown in FIG. 5, The configuration display table has the first to thirteenth stages. The first stage is for an entry corresponding to a main volume as a root. The second to fourth stages are entries corresponding to sub volumes for the main volume entered in the first stage. Also, the fifth to seventh stages are for entries corresponding to sub volumes for the sub volume entered in the second stage. The eighth to tenth stages are entries corresponding to sub volumes for the sub volume entered in the third stage. The eleventh to thirteenth stages are entries corresponding to sub volumes for the sub volume entered in the forth stage.

FIGS. 6 to 8 are diagrams respectively showing configuration display tables 424, 425, and 426. The difference from the configuration display table 423 shown in FIG. 5 is the difference in content of the stored data, which derives from the difference in time of the stored data. The configuration display table 423 in FIG. 5 shows the data state when 9:50 is specified as a data recovery time. The configuration display table 424 shown in FIG. 6 shows a data state when 12:00 is specified as a configuration recovery time. The configuration display table 425 shown in FIG. 7 shows a data state when 14:30 and 18:00 are respectively specified as a data recovery time and a configuration recovery time. The configuration display table 426 shown in FIG. 8 show a data state where 16:30 and 15:00 are respectively specified as a data recovery time and a configuration recovery time.

The configuration display table 424 is provided with a volume ID column 424A, a pre-recovery (current) column 424B, and an post-recovery column 424C. Also, the pre-recovery (current) column 424B includes a pair status column 424D and a data storage time column 424E, and the post-recovery column 424C includes a pair status column 424F and a data storage time column 424G. The configuration display table 425 is provided with a volume ID column 425A, a pre-recovery (current) column 425B, and an post-recovery column 425C. Also, the pre-recovery (current) column 425B includes a pair status column 425D and a data storage time column 425E, and the post-recovery column 425C includes a pair status column 425F and a data storage time column 425G. Moreover, the configuration display table 426 is provided with a volume ID column 426A, a pre-recovery (current) column 426B, and an post-recovery column 426C. Also, the pre-recovery (current) column 426B includes a pair status column 426D and a data storage time column 426E, and the post-recovery column 426C includes a pair status column 426F and a data storage time column 426G. Incidentally, description of the content of the data stored in the configuration display tables 424 to 426 is omitted because it is the same as that in the configuration display table 423.

Next, a data storage destination table 427 will be described. The data storage destination table 427 is used for specifying a storage destination where data in a volume is stored. FIG. 9 shows the data storage destination table.

As shown in FIG. 9, the data storage destination table 427 includes a storage source volume ID column 427A and a storage destination volume ID column 427B. The storage source volume ID column 427A is a column for storing the volume ID of a data storage source volume. The storage destination volume ID column 427B is a column for storing the volume ID of a data storage destination volume.

For example, when the data storage source volume is identical to the data storage destination volume, the same volume ID is stored in the storage source volume ID column 427A and the storage destination volume ID column 427B.

When data storage is conducted in the same volume, "4" is stored in each of the storage source volume ID column 427A and the storage destination volume ID column 427B, i.e., the same volume ID is stored in both the columns, as shown in the first stage of the data storage destination table 427 in FIG. 9. Also, when a data storage source volume and a data storage destination volume differ from each other, different volume IDs are stored in the storage source volume ID column 427A and the storage destination volume ID column 427B. "4" and "6" are stored in the storage source volume ID column 427A and the storage destination volume ID column 427B respectively, i.e., different volume IDs are stored in the columns, as shown in the second stage of the data storage destination table 427 in FIG. 9.

Next, configuration change notification information 428 will be described. The configuration change notification information 428 is information given to the configuration monitoring unit 413 from the backup recovery control unit 412 at the time of configuration recovery.

The configuration change notification information 428 include number-of-entries information 428A, change type information 428B, volume ID information 428C, change type information 428D, volume ID information 428E, change type information 428F, and volume ID information 428G.

The number-of-entries information 428A indicates the number of entries for configuration change. The change type information 428B, 428D, and 428F each show content of configuration change. The volume ID information 428C, 428E, and 428G each show an ID of a volume in which configuration is changed.

In the configuration change notification information 428 shown in FIG. 10, the number-of-entries information indicates "3", and thus includes three pairs of change type information and volume ID information. More specifically, the configuration change notification information 428 shows that: a pair of volumes with IDs 3 and 4 has been released; a pair of volumes with IDs 3 and 5 has been released; and a volume with ID 5 has been deleted.

Figure 11:
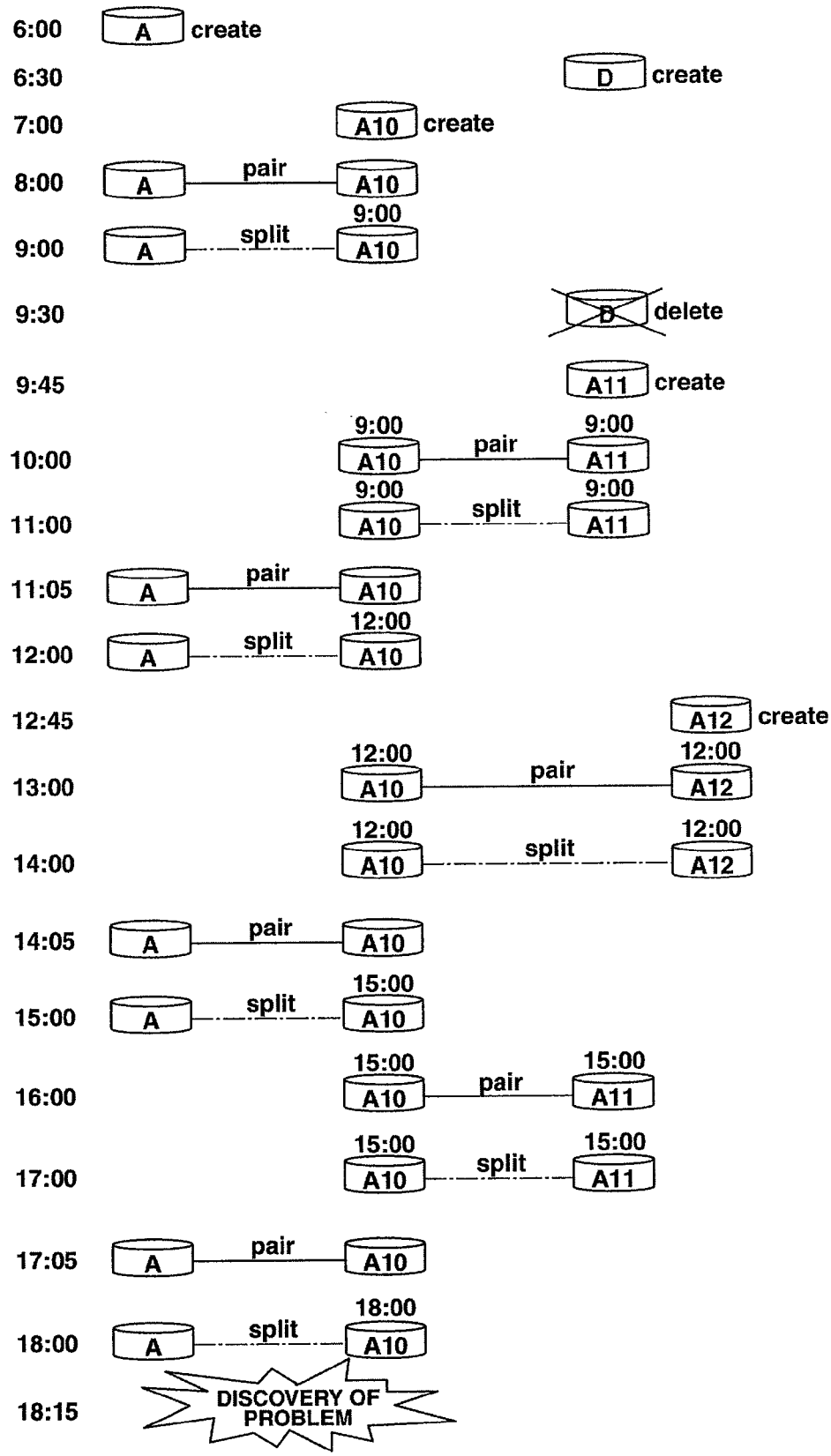
FIG. 11 is a diagram showing configuration change history according to the invention.

FIG. 11 is a diagram showing history of configuration change in the storage system 1 which corresponds to the configuration change stored in the configuration change history table 422 shown in FIG. 4. The operation conducted by a user and the configuration change executed in the storage system 1 will be described in chronological order below.

At the time of 6:00, a user creates a volume A. At the time of 6:30, the user creates a volume D. At the time of 7:00, the user creates a volume A10. At the time of 8:00, the user makes a pair of volume A and volume A10. At the time of 9:00, the pair of volume A and volume A10 is split. At the time of 9:30, the user deletes the volume D. At the time of 9:45, the user creates a volume A11. At the time of 10:00, the user makes a pair of volume A10 and volume A11. At the time of 11:00, the pair of volume A10 and volume A11 is split. At the time of 11:05, the pair of volume A and volume A10, which has been split, is made. At the time of 12:00, the pair of volume A and volume A10 is split. At the time of 12:45, the user creates a volume A12. At the time of 13:00, the user makes a pair of volume A10 and volume A12. At the time of 14:00, the pair of volume A10 and volume A12 is split. At the time of 14:05, the pair of volume A and volume A10, which has been split, is made. At the time of 15:00, the pair of volume A and volume A10 is split. At the time of 16:00, the pair of volume A10 and volume A11 is made. At the time of 17:00, the pair of volume A10 and volume A11 is split. At the time of 17:05, the pair of volume A and volume A10 is made. At the time of 18:00, the pair of volume A and volume A10 is split.

The above-described configuration change is performed in the storage system 1, and then, at the time of 18:15, a problem occurs in the storage system 1. Examples of problems include virus infection of the storage system 1, the occurrence of failure in a disk that constitutes an actual volume, and the discovery of user operation error.

Figure 12:
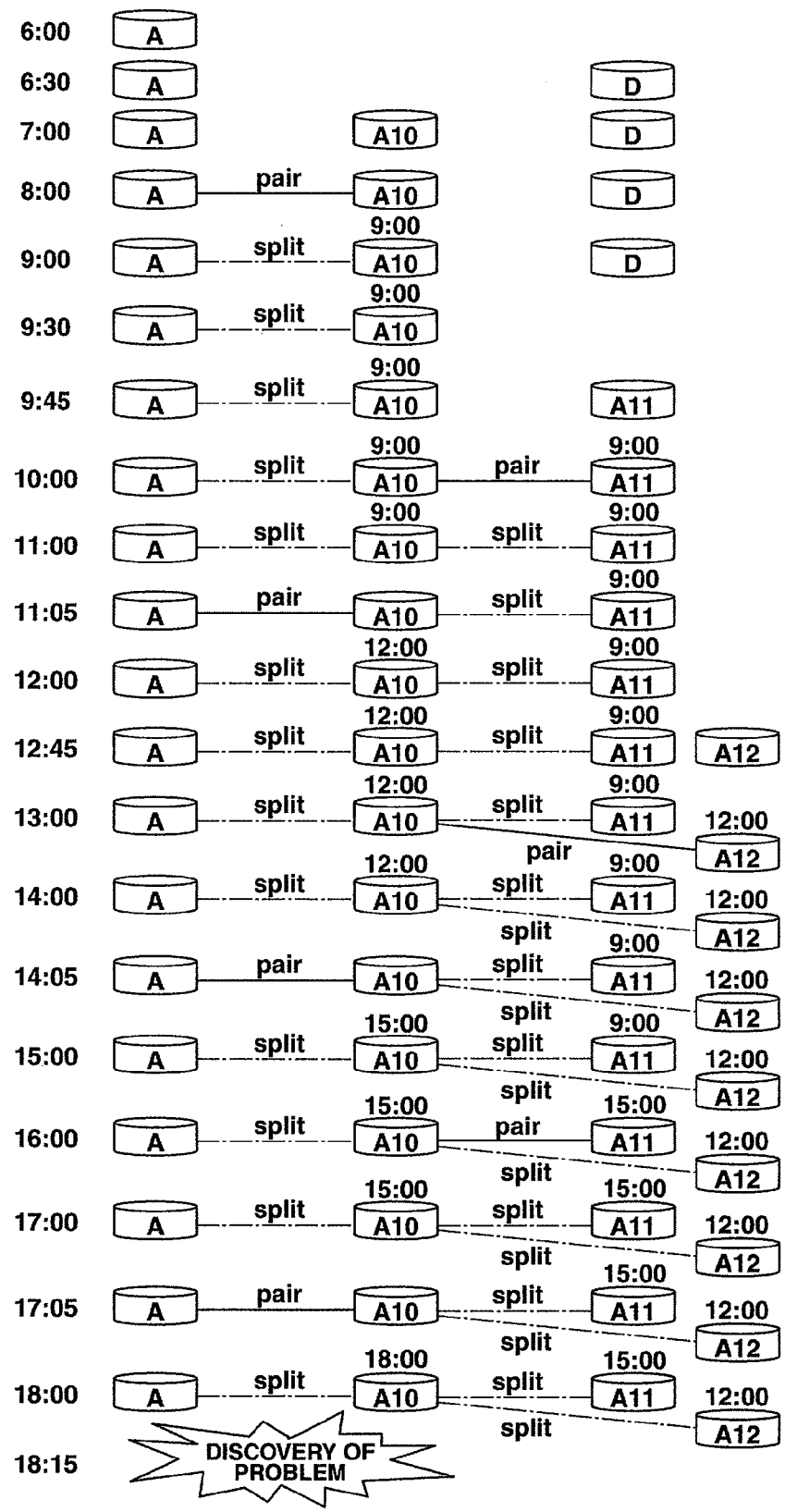
FIG. 12 is a diagram showing a volume status according to the invention.

FIG. 12 is a diagram showing a volume status corresponding to the configuration change in the storage system 1 shown in FIG. 11. The diagram illustrates volume status in chronological order and shows change in accordance with the configuration change described with reference to FIG. 11. The detailed description of FIG. 12 is omitted because it overlaps with the description for FIG. 11.

Figure 17:
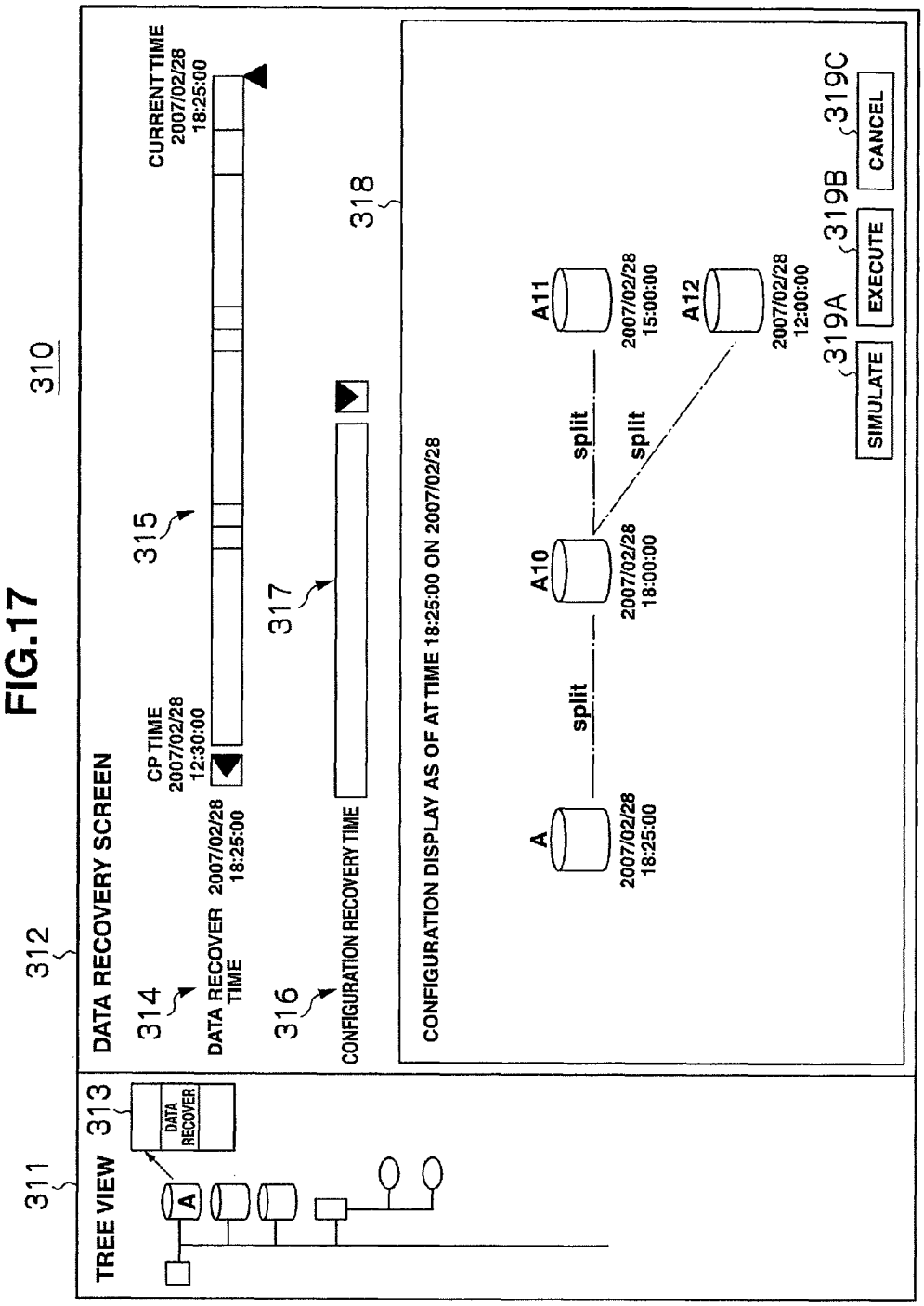
FIG. 17 is a diagram showing a screen displayed on a user interface according to the invention.

FIG. 17 is a diagram showing a screen 310 displayed on the user interface 300 when a user conducts recovery of the storage system 1 after a problem occurs. As shown in FIG. 17, the screen 310 has a tree view unit 311 and a data recovery screen unit 312.

The tree view unit 311 shows a volume hierarchical structure. A user positions a pointer over a volume in the tree view unit 311 to, e.g., right-click a mouse in an input unit of the user interface 300, which enables menu 313 to be displayed. When "data recovery" is selected from the menu display, the screen 310 displays the data recovery screen unit 312.

The data recovery screen unit 312 displays a data recovery time unit 314, a scroll bar 315, a configuration recovery time unit 316, a pull-down bar 317, and a configuration display screen unit 318.

The data recovery time unit 314 displays a data recovery time. The scroll bar 315 is used for a user to specify a data recovery time. The scroll bar 315 displays a checkpoint (CP) time and a current time. A user moves a pointer displayed near the scroll bar 315 by using the input unit of the user interface 300, enabling the specification of the data recovery time.

The configuration recovery time unit 316 displays a configuration recovery time. The pull-down bar 317 is used to display a time when configuration change was conducted and configuration change content by using the configuration change history table 422. A user can specify a configuration recovery time from the pull-downed content on configuration change by using the input unit the pull-down bar 317 in the user interface 300.

Note that, when a user conducts configuration change, both or either of the data recovery time and the configuration recovery time may be specified.

The configuration display screen unit 318 shows the current configuration of a specified volume. In FIG. 17, the configuration of volume A as of at time 18:25:00 is shown. It is shown that: volume A10 has been created as a sub volume for volume A; the volumes A11 and A12 have been created as sub volumes for volume A10; and volume A and volume A10 and volume A10 and the volumes A11/A12 are both in split status. Also, the times shown below the volumes A, A10, A11, and A12 each indicate which data in terms of time is held by each volume. For example, volume A and volume A10 have the data as of at time 18:25:00 and the data as of at time 18:00:00, respectively.

A simulate button 319A, an execution button 319B, and a cancel button 319C are displayed on the configuration display screen unit 318. The simulate button 319A is a button for executing simulation for which configuration would be obtained after conducting recovery based on the data recovery time, configuration recovery time, etc. specified by a user. The simulation result is displayed on a configuration display screen unit 318. The execution button 319B is a button for ordering execution of data recovery and configuration recovery based on the simulated configuration. The cancel button 319C is a button for cancelling the simulated configuration.

Next, the processing executed by the management server 400 will be described. First, configuration change information collection processing will be described with reference to FIGS. 22 to 24. Configuration change information collection processing specifically includes the processing at the time of volume creation/deletion shown in FIG. 22, the processing at the time of pair creation/split shown in FIG. 23, and the processing at the time of checkpoint (CP) acquisition shown in FIG. 24.

The processing at the time of volume creation/deletion will be described first. A user conducts various operations via the user interface 300 in volume creation/deletion. For example, in volume creation, a user selects a free logical device (LDEV: volume) on the user interface 300, and assigns a volume name to the free logical device. In volume deletion, a user selects a volume name. Note that, when a logical device is used by a user, entries can be made in the volume management table 421.

Figure 22:
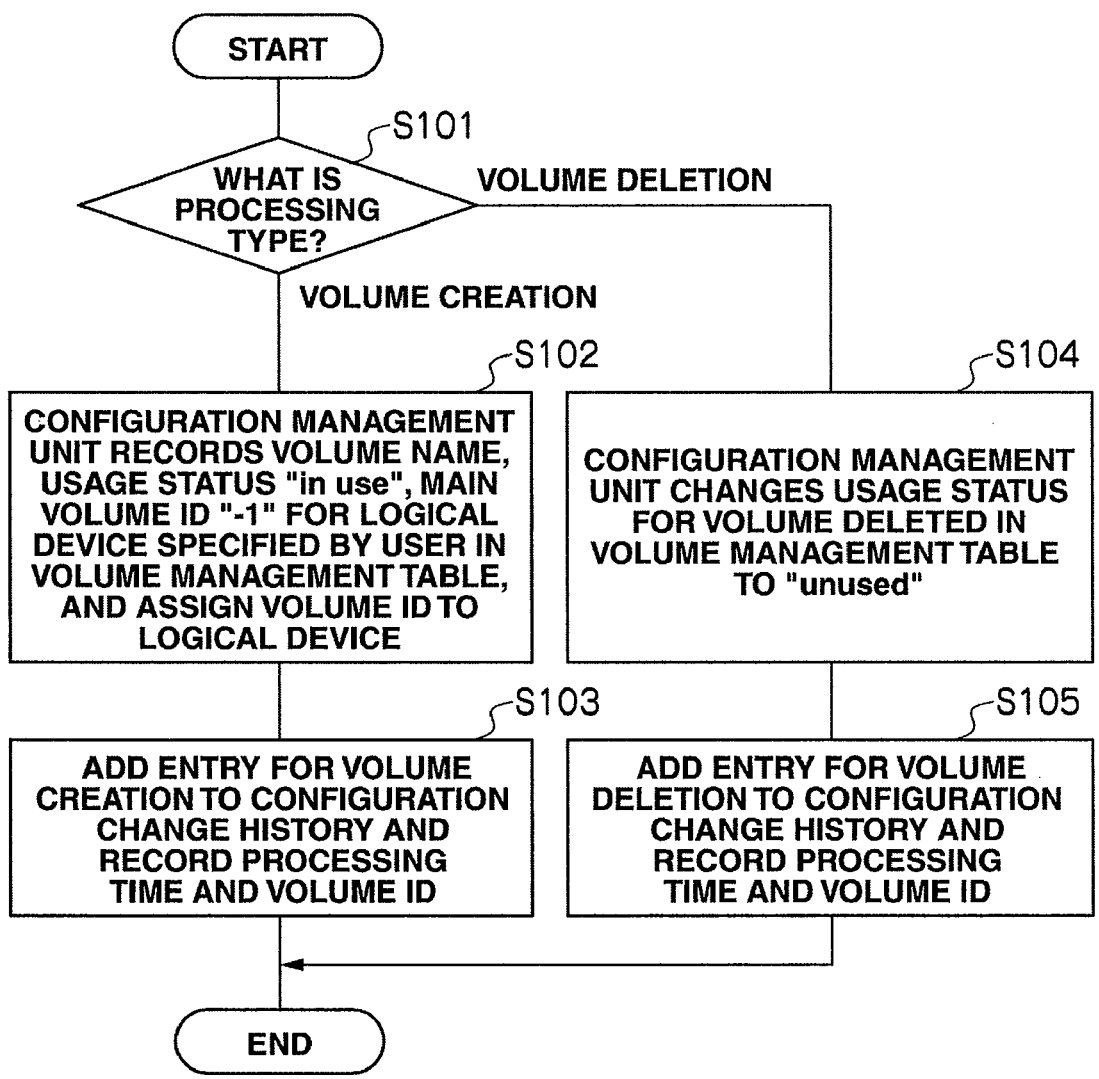
FIG. 22 is a flowchart showing processing for volume creation/deletion according to the invention.

FIG. 22 is a flowchart showing the processing at the time of volume creation/deletion. First, the configuration management unit 411 distinguishes between processing types, and more specifically judges whether the processing type is volume creation or volume deletion at step S101.

If the configuration management unit 411 determines that the processing type is volume creation (S101: volume creation), the configuration management unit 411 records, in the volume management table 421, a volume name, "in use" for the usage status, and "−1" as the volume ID for the logical device specified by a user, and assigns a volume ID to the logical device at step 102. Then, the configuration management unit 411 adds an entry for volume creation and records a processing time and a volume ID in the configuration change history table 422 at step S103.

On the other hand, if the configuration management unit 411 determines that the processing type is volume deletion (S101: volume deletion), the configuration management unit 411 change the usage status of the deleted volume to "unused" in the volume management table 421 as step S104. Then, the configuration management unit 411 adds an entry for volume deletion and records the processing time and volume ID in the configuration change history table 422 at step S105.

After the termination of the processing at step S103 or step S105, the configuration management unit 411 terminates the processing at the time of volume creation/deletion.

Figure 23:
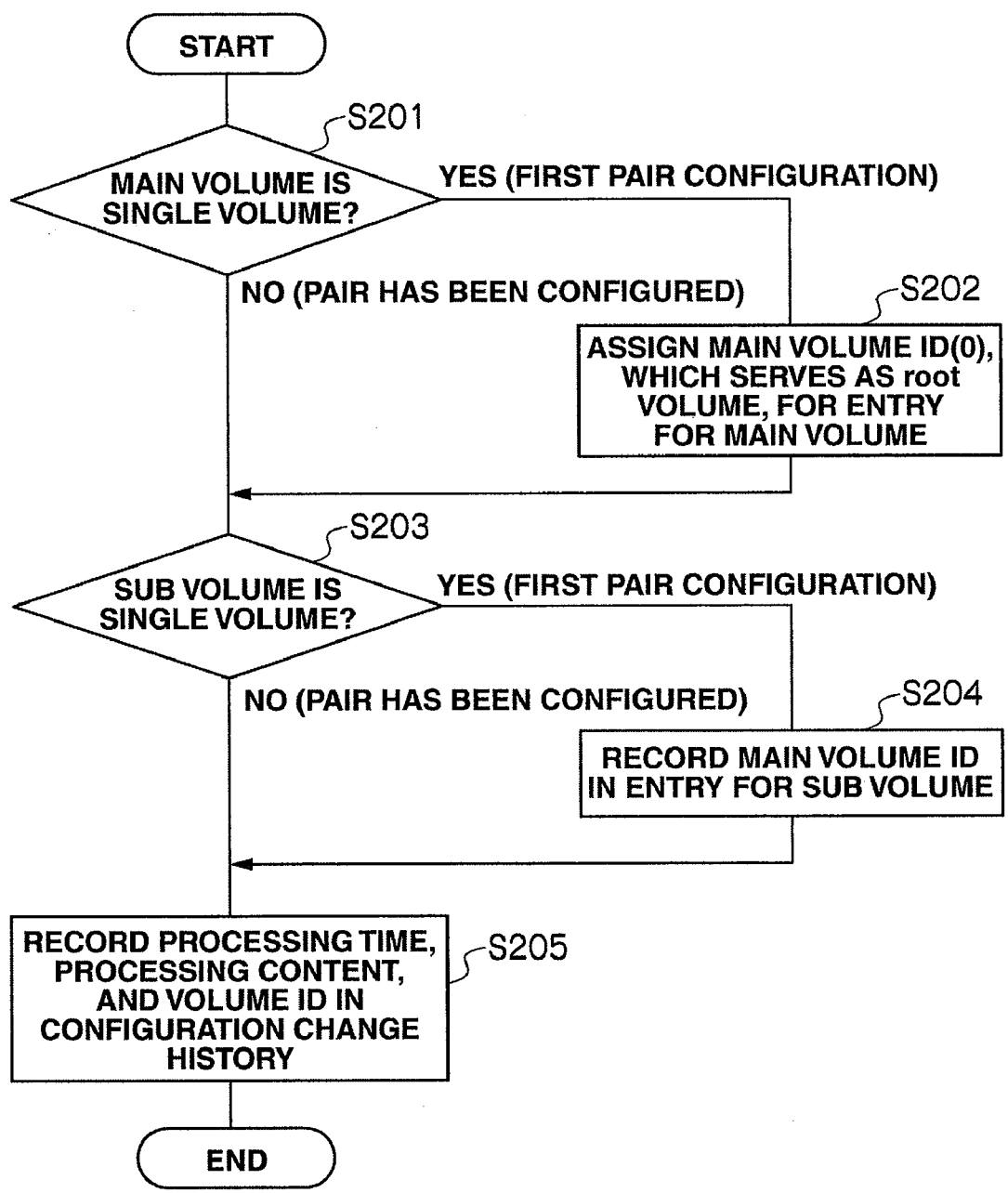
FIG. 23 is a flowchart showing processing for pair creation/split according to the invention.

In pair creation/split, a user conducts pair creation and split for volumes. FIG. 23 is a flowchart showing the processing at the time of pair creation/split. Step s201, the configuration management unit 411 first determines that a main volume is a single volume at step S201. This judgment is made based on the judgment on whether the main volume ID in the entry for the main volume in the volume management table 421 is "−1."

If the configuration management unit 411 determines that the main volume is a single volume (S201: YES), the configuration management unit 411 assigns a main volume ID (0) indicating a root volume for the main volume entry at step S202.

On the other hand, if the configuration management unit 411 determines that the main volume is not a single volume (S201: NO) or has assigned the main volume ID indicating a root volume, the configuration management unit 411 judges whether a sub volume is a single volume.

If the configuration management unit 411 determines that a sub volume is a single volume (S203: YES), the configuration management unit 411 records the main volume ID in the entry for the sub volume at step S204.

On the other hand, if the configuration management unit 411 determines that a sub volume is not a single volume (S203: NO), or records the main volume ID in the entry for the sub volume at step S204, the configuration management unit 411 records the processing time, processing content, and volume ID in configuration change history at step S205. Then, processing terminates.

Note that, in pair release, the configuration management unit 411 conducts pair release after confirming that the release-target pair has no lower pair, i.e., the sub volume ID of the release-target pair does not exist in the columns for main volume IDs for other volumes.

Figure 24:
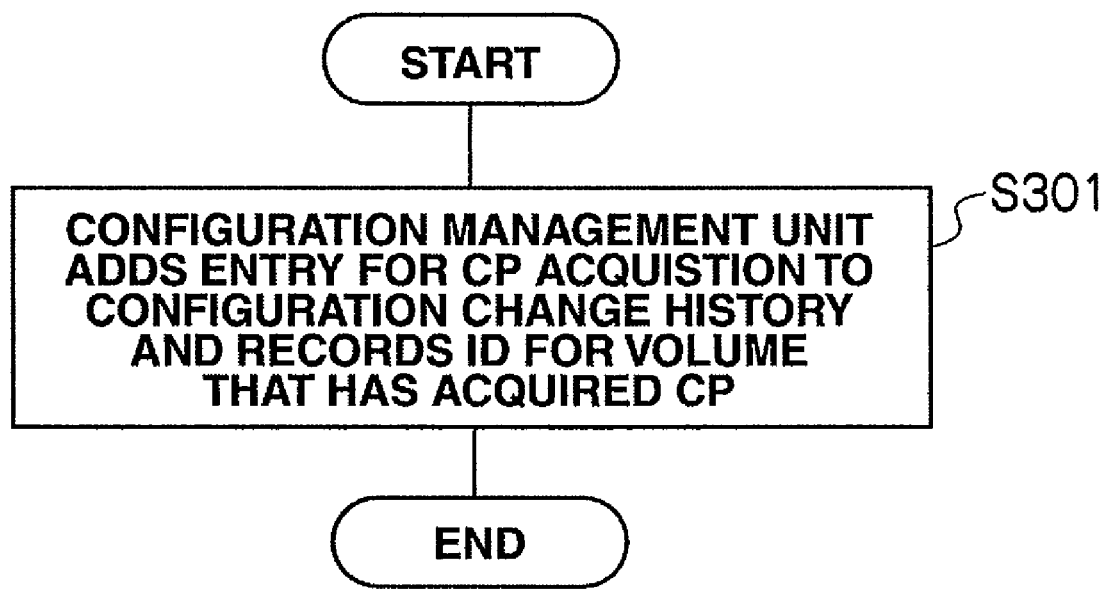
FIG. 24 is a flowchart showing processing for checkpoint acquisition according to the invention.

FIG. 24 is a flowchart showing the processing at the time of checkpoint acquisition. This processing is executed when a user conducts checkpoint acquisition or when a checkpoint is input in the storage system.

At step S301, the configuration management unit 411 adds an entry for checkpoint acquisition, and records a volume ID that has acquired a checkpoint.

Figure 25:
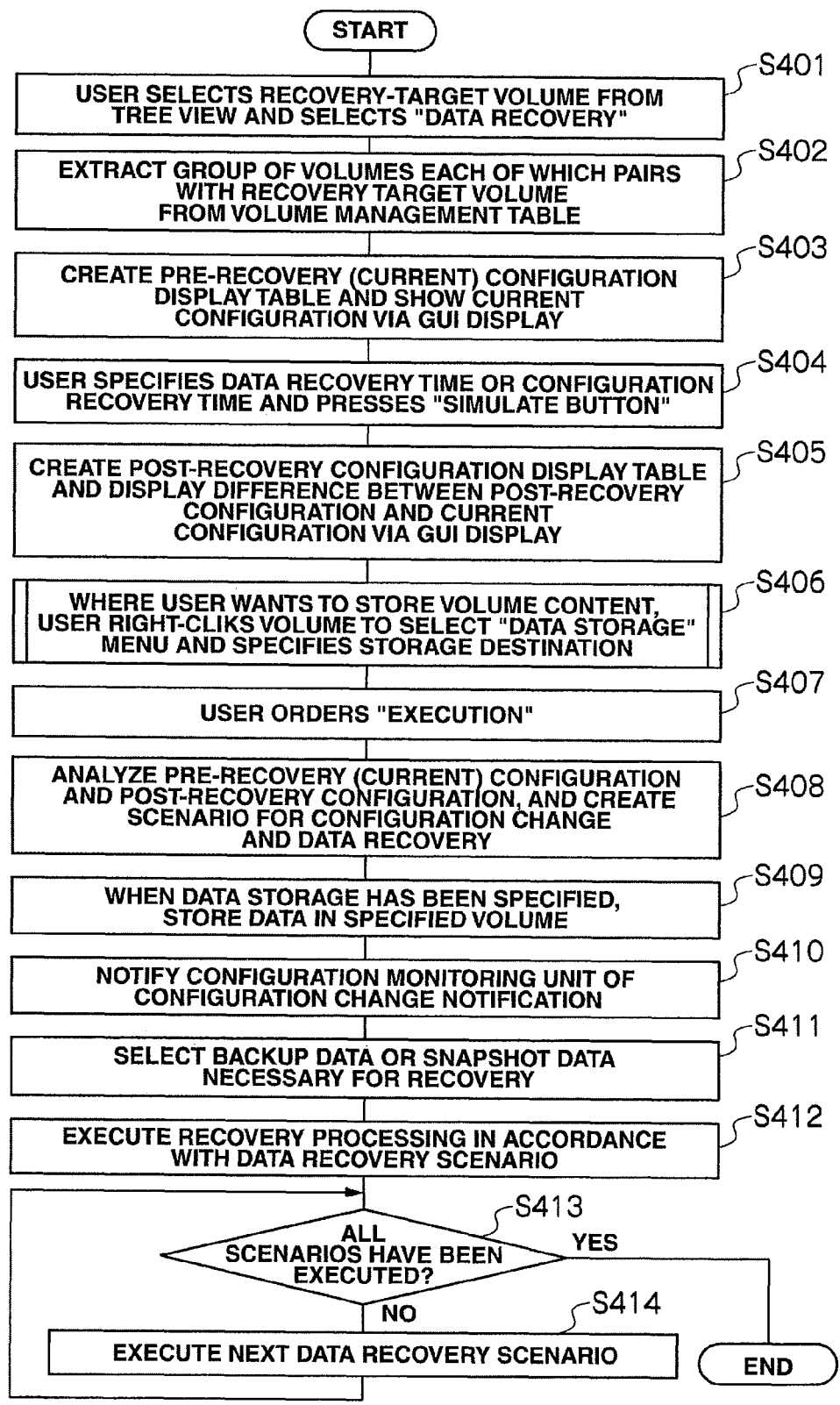
FIG. 25 is a flowchart illustrating operation for recovery processing according to the invention.

Next, the flow of operation of recovery processing will be described. FIG. 25 is a flowchart explaining the operation of recovery processing.

At step S401, a user selects a recovery-target volume from the tree view unit 311, and selects "data recovery" by using the input unit of the user interface 300. At step S402, the backup recovery control unit 412 extracts a group of volumes each of which is paired with a recovery-target volume from the volume management table 421.

Incidentally, when volume A10 is selected as a recovery-target volume, the extracted volume group includes the main volume A for volume A10 and the volumes A11 and A12 for which volume A10 is a main volume. If any of the volumes A, A10, A11, and A12 is selected, the above volume group can be extracted from the volume management table 421.

Next, the backup recovery control unit 412 creates a pre-recovery (current) configuration display table (e.g., the configuration display table 423), and displays via a GUI (graphical user interface) the current configuration on the user interface 300 at step S403.

At step S404, a user specifies a data recovery time or configuration recovery time based on the display on the user interface 300, and presses the simulate button 319A.

At step S405, the backup recovery control unit 412 creates an post-recovery configuration display table (e.g., the configuration display table 424), and shows the difference between the post-recovery configuration and the current configuration on a GUI display. For example, a volume that exists in the current configuration but not in the post-recovery configuration is displayed with a faint color, e.g., gray, compared to other volumes. Note that the configuration difference does not need to be displayed in gray, so long as it is distinguishable from the other configuration parts in display.

At step S406, when a user wants to store the content of a volume, the user, for example, positions a pointer over the volume, right-clicks the mouse in the input unit of the user interface 300, which enables menu 313 to be displayed, displays a menu on the configuration display screen unit 318, and selects "data storage" in the menu. Then, the volume data is stored by using a data storage unit 318C displayed on the configuration display screen unit 318. Subsequently, a user orders "execution" by pressing the execution button 319B at step S407.

Then, the backup recovery control unit 412 analyzes the pre-recovery (current) configuration and the post-recovery configuration, and creates scenarios for configuration change and data recovery at step S408. For example, the scenario for data recovery when 09:50 is specified as a data recovery time is from (a) to (g) as follows: (a) the pair configuration of volume A10 and volume A11 is released. (b) the pair configuration of volume A10 and volume A12 is released. (c) volume A12 is deleted. (d) Volume A and volume A10 are put into a pair. (e) Volume A is restored with backup data, and is overwritten with the journal that covers the period up to time 09:00. (f) The pair of volume A and volume A10 is split. (g) Volume A is overwritten with the journal that covers the period up to time 09:50.

Then, the backup recovery control unit 412 stores data of the specified volume if the data storage is specified at step S409. In the usage status column 421E in the volume management table 421, "reserved" is changed to "in use." Then, copy is conducted with paired storage source and storage destination.

Next, the backup recovery control unit 412 notifies the configuration monitoring unit 413 of configuration notification change at step S410.

Then, the backup recovery control unit 412 selects backup data or snapshot data necessary for recovery at step S411. After that, the backup recovery control unit 412 executes recovery processing in accordance with a data recovery scenario at step S412.

Upon starting execution of recovery processing, at step S413, the backup recovery control unit 412 judges whether or not all the scenarios have been executed. If the backup recovery control unit 412 determines that all the scenarios have not been executed (S413: NO), the backup recovery control unit 412 executes the next scenario. On the other hand, if the backup recovery control unit 412 determines that all the scenarios have been executed (S413: YES), the backup recovery control unit 412 terminates this processing.

Figure 26:
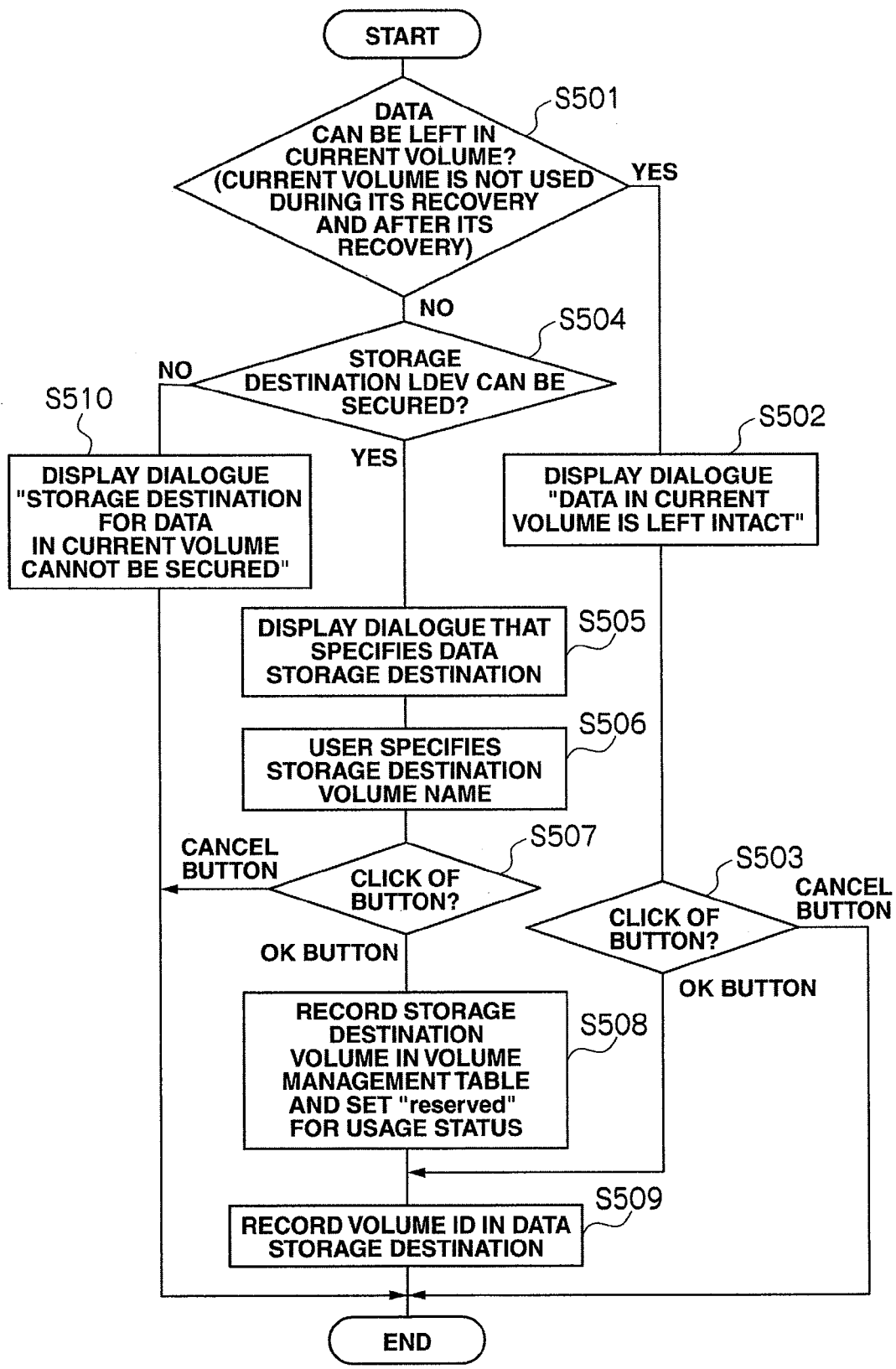
FIG. 26 is a flowchart showing data storage destination specification processing according to the invention.

Next, data storage destination specification processing at step S406 will be described. FIG. 26 is a flowchart showing data storage destination specification processing.

First, the backup recovery control unit 412 judges whether data can be left in the current volume at step S501.

If the backup recovery control unit 412 judges that data can be left in the current volume (S501: YES), the backup recovery control unit 412 executes processing for displaying, e.g., the dialogue "the data in the current volume is left intact" in a data storage column 318B in the user interface 300 at step S502.

After confirming the above display, a user selects an "OK button" or "cancel button." At step S503, the backup recovery control unit 412 judges whether it has acquired input information from the "cancel button" or input information from the "OK button". Upon acquiring the input information from the "OK button", the backup recovery control unit 412 executes processing at step S509 described later, while upon acquiring the input information from the "cancel button", the backup recovery control unit 412 terminates this data storage destination specification processing.

On the other hand, if the backup recovery control unit 412 judges that the current volume cannot be left in the current volume (S501: NO), the backup recovery control unit 412 judges whether or not a storage destination volume (LDEV) can be reserved at step S504. If the backup recovery control unit 412 determines that a storage destination volume (LDEV) can be reserved (S504: YES), the backup recovery control unit 412 displays a dialogue that specifies a data storage destination at step S505. For example, the backup recovery control unit 412 displays a dialogue, "please specify a data storage destination" as the data storage column 318B in the user interface 300.

When viewing the dialogue display, the user specifies the name of a storage destination volume in the user interface 300 at step S506. The backup recovery control unit 412 acquires the storage destination volume name based on the user's input.

After confirming the display, the user selects "OK button" or "cancel button". The backup recovery control unit 412 judges whether or not it has acquired input information from the "cancel button" or input information from the "OK button" based on the user's selection at step S507. Upon acquiring the input information from the "OK button", the backup recovery control unit 412 records the storage destination volume in the volume management table 421, and sets "reserved" for the usage status at step S508. Then, the backup recovery control unit 412 records a volume ID for the storage destination volume in the volume management table 421. After the completion of the processing at step S509, the backup recovery control unit 412 terminates this processing.

On the other hand, when the backup recovery control unit 412 determines that a storage destination volume cannot be reserved at step S504, the backup recovery control unit 412 displays a dialogue, "a data storage destination for the current volume cannot be reserved" as a data storage column 318A in the user interface 300 at step S510. Then, the backup recovery control unit 412 terminates this processing. Note that the backup recovery control unit 412 terminates this processing also when there has been the selection of the "cancel button" at step S507.

Next, data recovery in the storage system 1 configured as described above will be described for the following cases: (1) when data as of at an arbitrary point in time is restored; (2) when a configuration as of at an arbitrary point in time is restored; and (3) when data as of at an arbitrary point in time and configuration as of at an arbitrary point in time are restored.

First, (1) when data as of at an arbitrary point in time is restored will be described. Volume A being restored to its state as of at time 9:50:00, which is an example of an arbitrary point in time, will be described.

Figure 18:
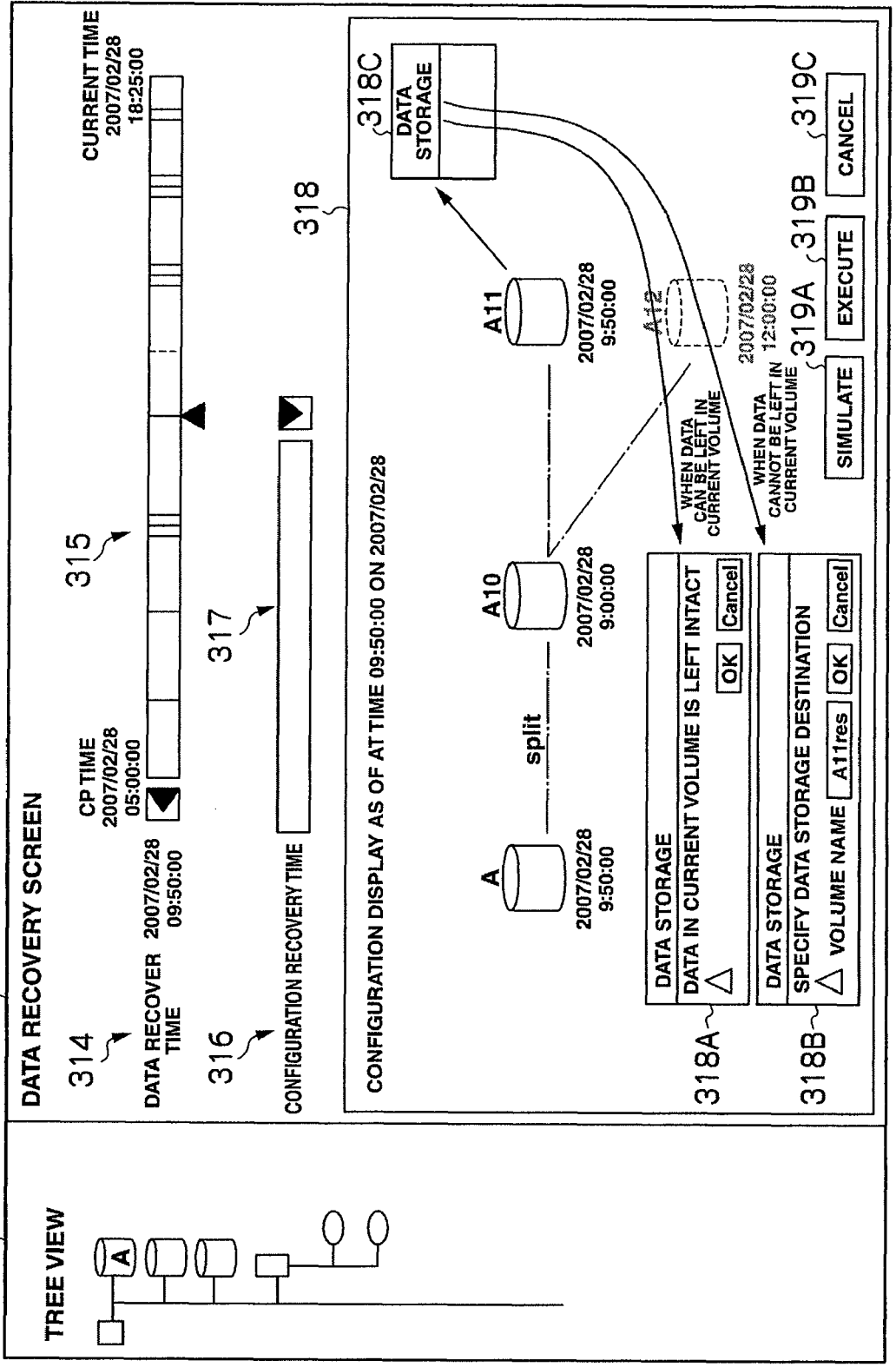
FIG. 18 is a diagram showing a screen displayed on a user interface according to the invention.

FIG. 18 is a diagram showing a screen 320 displayed on the user interface 300 when a user specifies volume A in the tree view unit 311 and time 09:50:00 in the data recovery time unit 314 by operating the scroll bar 315 and presses the simulate button 319A in the screen 310 shown in FIG. 17.

Figure 13:
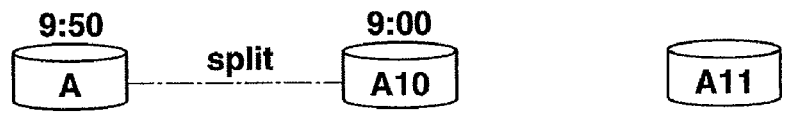
FIG. 13 is a diagram showing a volume configuration according to the invention.

FIG. 13 is a diagram showing the configuration of volume A as of at time 09:50:00. Volume A10 has been created as a sub volume for volume A, and volume A11 exists as a single volume. Volume A and volume A10 have been paired with each other, but are in a split state. Incidentally, it is shown that the data as of at time 9:50:00 and the data as of at time 09:00:00 are respectively stored in volume A and volume A10.

The information on the configuration of volume A is acquired from the configuration change history table 422. Also, the configuration display table 423 shown in FIG. 5 is created based on the acquired information.

The configuration of volume A as of at time 09:50:00 is displayed on the configuration display screen unit 318 based on the information reflected in the configuration display table 423. Here, the difference between the current configuration and the configuration as of at time 09:50:00 is displayed in gray. In other words, volume A12 is displayed in gray, since volume A12 has been created in the current configuration, while volume A12 was not created in the configuration as of at time 09:50:00.

Also, the data storage unit 318C is displayed on the configuration display screen unit 318. The data storage unit 318C is used to order the data storage for the current volume, and is displayed when a user selects, e.g., volume A11 and right-clicks it. Then, when the user selects "data storage" in the data storage unit 318C, the data storage column 318A or the data storage column 318B is displayed. Note that both the data storage column 318A and the data storage column 318B are shown in FIG. 18 for ease of description.

The data storage column 318A is displayed when the current volume data is left intact. The data storage column 318B is displayed when: the current volume data cannot be left intact; and a storage destination needs to be specified. When "data storage" is selected in the data storage unit 318C as in the above example, the data storage column 318A is displayed if the data in volume A11 can be left intact. An "OK button" and a "cancel button" are displayed in the data storage column 318A. When a user wants the data in volume A11 to be left, the user clicks the "OK button"; while the data in volume A11 does not need to be left, the user clicks the "cancel button". When the data in volume A11 cannot be left intact, the data storage column 318B is displayed. A volume name, an "OK button", and a "cancel button" are displayed in the data storage column 318B. The user specifies a data storage destination by a text box, in which "A11res" displayed as a volume name, and the user can change the volume name if necessary. Then, the data in volume A11 is stored in the specified storage destination when the user presses the "OK button". Alternatively, the operation is cancelled when the user presses the "cancel button." Note that "A11res" is a volume name, which has been automatically created in the storage system 1 and displayed in advance. The user can manually change the volume name using the user interface 300.

After conducting the operation described above concerning whether or not the volume data is left, the user presses the execution button 319B or the cancel button 319C. When the execution button 319B is pressed, volume A is recovered to its data state as of at time 09:50:00 while the configuration change scenario in accordance with the change record recorded in the configuration display table 423 is followed. The data recovery is conducted by the backup recovery control unit 412 in accordance with the configuration change scenario based on the backup data backed up in the backup apparatus 600, the snapshot data held in the sub volume, and the journal data stored in the volume 504.

Incidentally, data as of at a time later than a time when the snapshot data held in the sub volume was stored is recovered, the data can be recovered by using the snapshot data and the journal data. For example, if data recovery time 16:00 is specified, the volumes A and A10 are resynchronized based on the data in volume A11 as of at time 15:00, and the journal data from time 15:00 to time 16:00 is reflected in volume A.

Next, (2) when a configuration as of at an arbitrary point in time is restored will be described. Volume A being restored to its state as of at time 12:00:00, which is an example of an arbitrary point in time, will be described.

Figure 19:
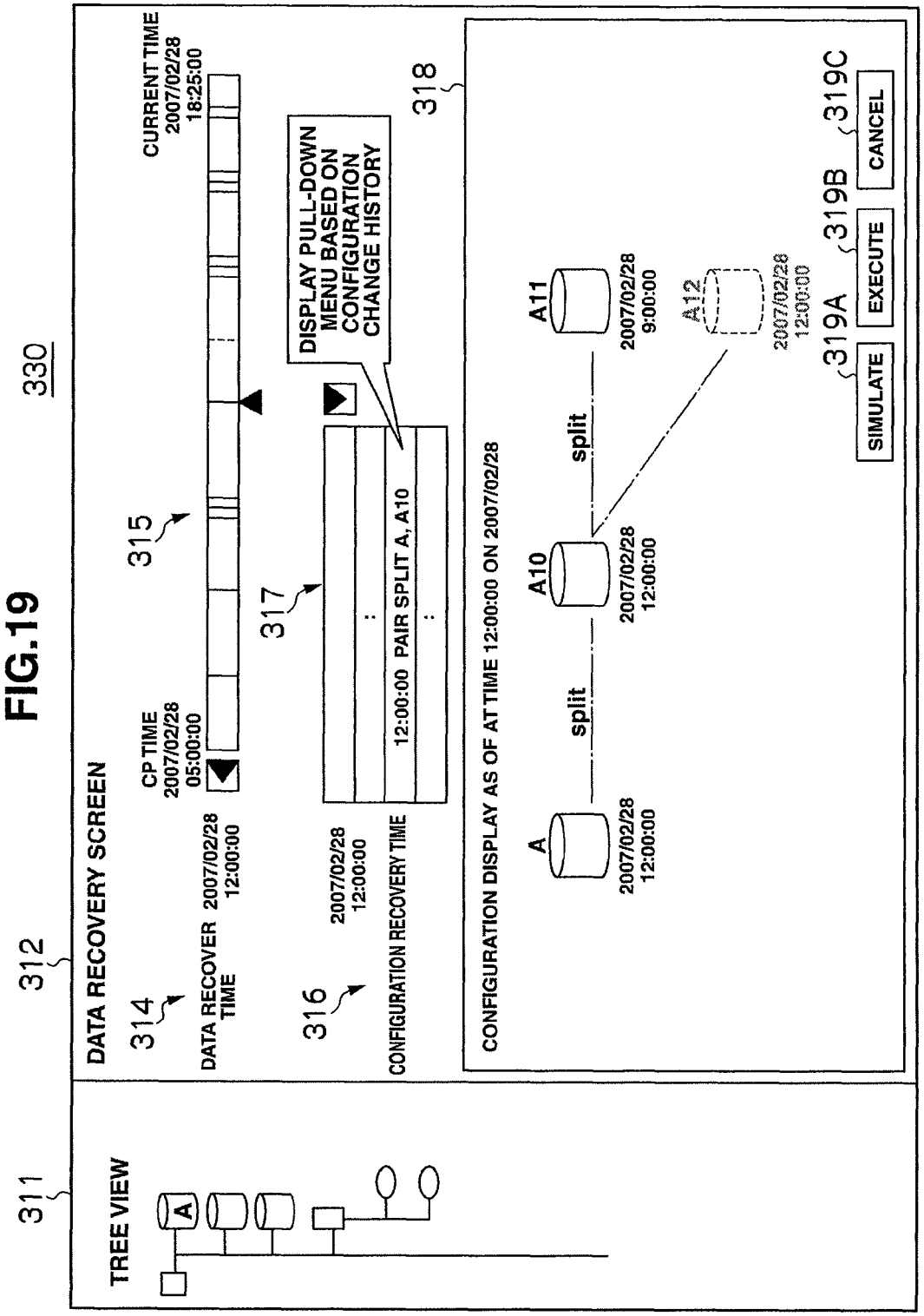
FIG. 19 is a diagram showing a screen displayed on a user interface according to the invention.

FIG. 19 is a diagram showing a screen 330 displayed on the user interface 300 when a user specifies volume A in the tree view unit 311 and time 12:00:00 in the configuration recovery time unit 316 by operating the pull-down bar 317 and presses the simulate button 319A in the screen 310 shown in FIG. 17. It is shown in FIG. 19 that a configuration recovery time is specified by using the pull-down bar 317. Note that a pull-down menu is displayed based on the configuration change in the configuration change history table 422.

Figure 14:
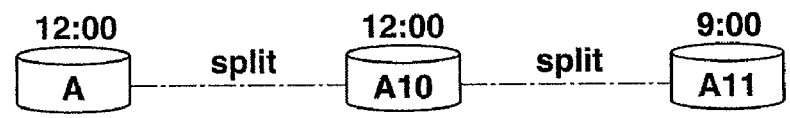
FIG. 14 is a diagram showing a volume configuration according to the invention.

FIG. 14 is a diagram showing the configuration of volume A as of at time 12:00:00. Volume A10 has been created as a sub volume for volume A, and volume A11 has been created as a sub volume for volume A10. Volume A and volume A10 have been paired with each other, but are in the split state. Volume A10 and volume A11 have been paired with each other, but are in the split state. Incidentally, it is shown that the data as of at time 12:00:00, the data as of at time 12:00:00, and the data as of at time 09:00:00 are respectively stored in volume A, volume A10, and volume A11.

The information on the configuration of volume A is acquired from the configuration change history table 422. Also, the configuration display table 424 shown in FIG. 6 is created based on the acquired information.

The configuration of volume A as of at time 12:00:00 is displayed on the configuration display screen unit 318 based on the information reflected in the configuration display table 424. Here, the difference between the current configuration and the configuration as of at time 12:00:00 is displayed in gray. In other words, volume A12 is displayed in gray, since volume A12 has been created in the current configuration, while volume A12 was not created in the configuration as of at time 12:00:00.

After referring to the display in the configuration display screen unit 318, a user presses the execution button 319B or the cancel button 319C. When the execution button 319B is pressed, volume A is recovered to its configuration state as of at time 12:00:00 while the configuration change scenario in accordance with the change record recorded in the configuration display table 424 is implemented. The data recovery is conducted by the backup recovery control unit 412 in accordance with the configuration change scenario based on the backup data backed up in the backup apparatus 600, the snapshot data held in the sub volume, and the journal data stored in the volume 504.

Next, (3) when data as of at an arbitrary point in time and a configuration as of at an arbitrary point in time are restored. When data as of at an arbitrary point in time and a configuration as of at an arbitrary point in time are restored, there are the following cases: (3a) when the data recovery time is earlier than the configuration recovery time and (3b) when the data recovery time is later than the configuration recovery time. These cases will be described below.

First, (3a) when the data recovery time is earlier than the configuration recovery time will be described. The case where: time 14:30:00 is specified as the data recovery time for volume A; and time 18:00:00 is specified as the configuration recovery time will be described.

Figure 20:
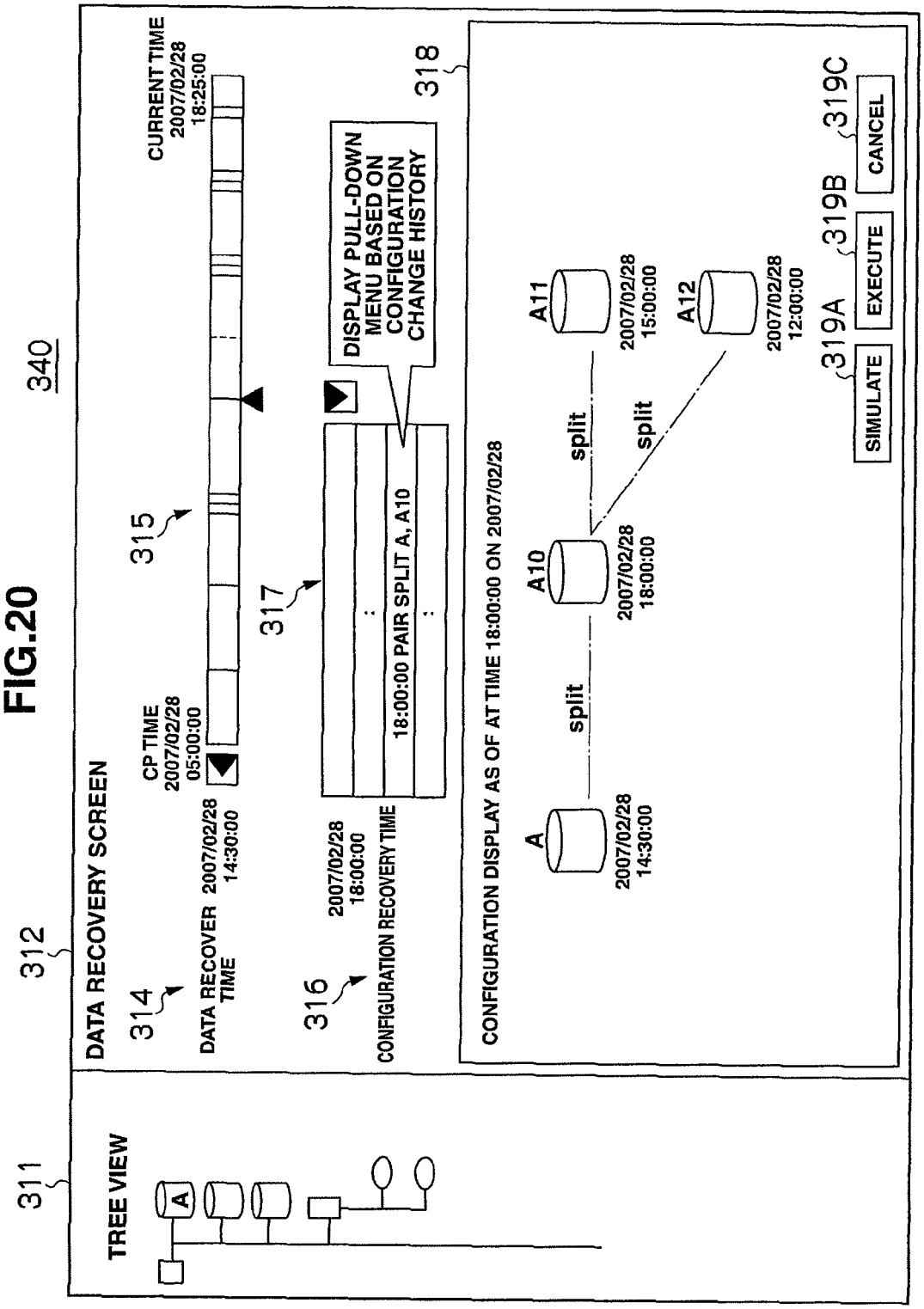
FIG. 20 is a diagram showing a screen displayed on a user interface according to the invention.

FIG. 20 is a diagram showing a screen 340 displayed on the user interface 300 when a user specifies volume A in the tree view unit 311; time 14:30:00 in the data recovery time unit 314 by operating the scroll bar 315; and time 18:00:00 in the configuration recovery time unit 316 by operating the pull-down bar 317, and presses the simulate button 319A in the screen 310 shown in FIG. 17.

Figure 15:
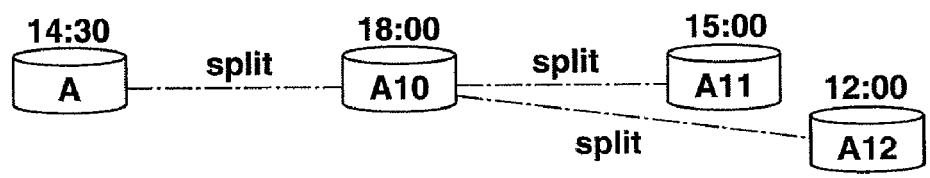
FIG. 15 is a diagram showing a volume configuration according to the invention.

FIG. 15 is a diagram showing the configuration of volume A as of at time 18:00:00. Volume A10 has been created as a sub volume for volume A, and also, the volumes A11 and A12 have been created as sub volumes for volume A10. Volume A and volume A10 have been paired with each other, but are in the split state. Volume A10 and each of the volumes A11 and A12 have been paired with each other, but are in the split state. Incidentally, it is shown that the data as of at time 14:30:00, the data as of at time 18:00:00, the data as of at time 15:00:00, and the data as of at time 12:00:00 are respectively stored in the volumes A, A10, A11, and A12.

The information on the configuration of volume A is acquired from the configuration change history table 422. Also, the configuration display table 425 shown in FIG. 7 is created based on the acquired information.

The configuration of volume A as of at time 18:00:00 is displayed on the configuration display screen unit 318 based on the information reflected in the configuration display table 425.

After referring to the display in the configuration display screen unit 318, a user presses the execution button 319B or the cancel button 319C. When the execution button 319B is pressed, volume A is recovered to its data state as of at time 14:30:00 and to its configuration state as of at time 18:00:00 while the configuration change scenario in accordance with the change record recorded in the configuration display table 425 is implemented. The recovery is conducted by the backup recovery control unit 412 in accordance with the configuration change scenario based on the backup data backed up in the backup apparatus 600, the snapshot data held in the sub volume, and the journal data stored in the volume 504.

Next, (3b) when the data recovery time is later than the configuration recovery time will be described. The case where: time 16:30:00 is specified as the data recovery time for volume A; and time 15:00:00 is specified as the configuration recovery time will be described.

Figure 21:
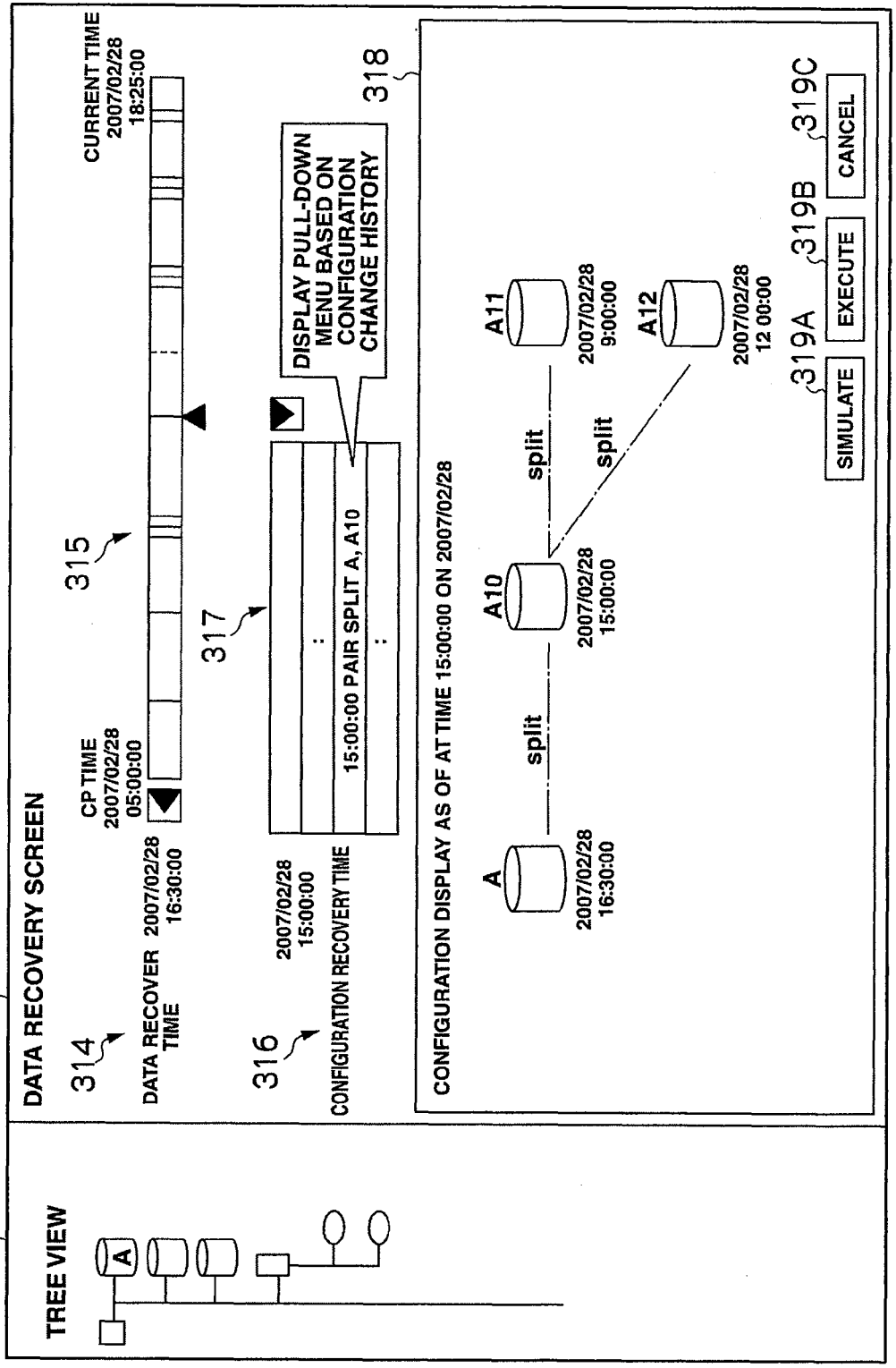
FIG. 21 is a diagram showing a screen displayed on a user interface according to the invention.

FIG. 21 is a diagram showing a screen 350 displayed on the user interface 300 when a user specifies volume A in the tree view unit 311; time 16:30:00 in the data recovery time unit 314 by operating the scroll bar 315; and time 15:00:00 in the configuration recovery time unit 316 by operating the pull-down bar 317, and presses the simulate button 319A in the screen 310 shown in FIG. 17.

Figure 16:
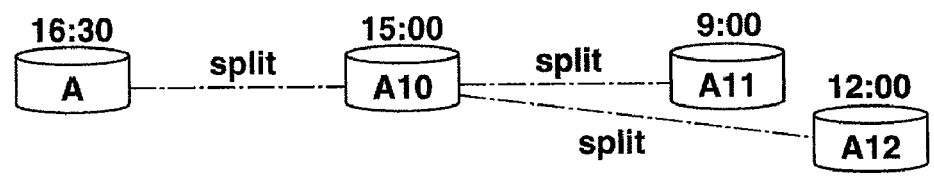
FIG. 16 is a diagram showing a volume configuration according to the invention.

FIG. 16 is a diagram showing the configuration of volume A as of at time 15:00:00. Volume A10 has been created as a sub volume for volume A, and the volumes A11 and A12 have been created as sub volumes for volume A10. Volume A and volume A10 have been paired with each other, but are in the split state. Volume A10 and each of the volumes A11 and A12 have been paired with each other, but are in the split state. Incidentally, it is shown that the data as of at time 16:30:00, the data as of at time 15:00:00, the data as of at time 09:00:00, and the data as of at time 12:00:00 are respectively stored in the volumes A, A10, A11, and A12.

The information on the configuration of volume A is acquired from the configuration change history table 422. Also, the configuration display table 426 shown in FIG. 8 is created based on the acquired information.

The configuration of volume A as of at time 15:00:00 is displayed on the configuration display screen unit 318 based on the information reflected in the configuration display table 426.

After referring to the display in the configuration display screen unit 318, a user presses the execution button 319B or the cancel button 319C. When the execution button 319B is pressed, volume A is recovered to its data state as of at time 16:30:00 and to its configuration state as of at time 15:00:00 while the configuration change scenario in accordance with the change record recorded in the configuration display table 426 is implemented. The recovery is conducted by the backup recovery control unit 412 in accordance with the configuration change scenario based on the backup data backed up in the backup apparatus 600, the snapshot data held in the sub volume, and the journal data stored in the volume 504.

Incidentally, the description of volume data storage has been omitted regarding cases (2) and (3); however, the data storage unit 318C may be displayed on the configuration display screen unit 318 via user operation to specify the storage of the current data, as in case (1) described above.

According to this embodiment, a user can implement backup of the data stored in the storage apparatus 500 and configuration change of the storage apparatus 500 by using the storage system 1.

More specifically, the configuration management unit 411 and the backup recovery control unit 412 in the storage system 1 collect the content of configuration change at the time of configuration change of the storage apparatus 500. The collected content is the content stored in each of the volume management table 421 and the configuration change history table 422.

Then, when the storage apparatus 500 is recovered to its correct state as of at a point in time after the discovery of virus infection, disk failure, user operation error, etc. in the storage system 1, the user can specify a recovery-target volume and at least either a data recovery time or a configuration recovery time by using the screen 310 displayed on the user interface 300. Then, the user can recognizes the difference between the current configuration and the configuration as of at the specified time by pressing the simulate button 319A. Therefore, simulation concerning which state the recovery-target volume is restored to can be performed easily. Also, the user can specify a storage destination volume in storing the current data.

The backup recovery control unit 412 also creates a scenario for data recovery, and executes recovery processing based on the backup data, snapshot data, and journal data.

Moreover, the influence on the configuration monitoring program 405 is considered in the storage system 1. More specifically, where a pair configuration is released for recovery in recovery processing, the information on pair release and volume deletion is given to the configuration monitoring unit 413 via the configuration change notification shown in FIG. 10 taking the influence on the configuration monitoring program 405 that monitors pair configurations into consideration. This notification enables coordination between the backup recovery control unit 412 and the configuration monitoring unit 413. Accordingly, configuration monitoring can be implemented without causing no target pair for monitoring because of pair release or volume deletion and monitoring errors.

Furthermore, according to the invention, recovery is conducted for a group including a main volume as a root on a volume basis. Therefore, there is no effect on the business application programs 103 and 203 that regard a group composed of volumes different from a recovery-target main volume an access target. Also, a user can make a selection on a data recovery time for each volume. The business application programs 102 and 203 are not allowed to access a recovery-in-progress volume during the recovery of data or volume configuration. Therefore, there is also a method in which access to the relevant volume from the hosts 100 and 200 is blocked during recovery; and an access path is provided to make the volume accessible after recovery. The business application programs 103 and 203 judge whether or not the volume is accessible to allow the access to be made. As a result, any influence on the business application programs 102 and 203 can be avoided.

In this embodiment, volume pair configuration change made in the storage apparatus 500 has been described as an example of configuration change; however, the volume pair configuration in the storage apparatus 500 does not need to be employed. More specifically, another storage apparatus may be provided in the storage system 1, making a pair of a volume in the storage apparatus and a volume in the storage apparatus 500. Configuration change in a cascade configuration and hierarchical configuration as well as a pair configuration for volumes may be adopted.

This embodiment has been described regarding the storage system 1 including: the hosts 100 and 200; the storage apparatus 500 having the plural volumes 504 that store data written from the hosts 100 and 200 and plural volumes 504 that store journal data for the data; the management server 400 that manages the storage apparatus 500; and the backup apparatus 600 that backs up the data written to the storage apparatus 500, in which the management server 400 manages the configuration change history table 422 that stores, as a change history, at least configuration change and a change time for the plural volumes and manages the change history stored in the configuration change history table 422; acquires specification of a recovery-target volume and specification of a recovery time and then acquires, from the configuration change history table 422, information on the specified volume and the specified recovery time; shows on the configuration display screen unit 318, a point of difference between the current configuration of the specified volume and the configuration of the specified volume as of at the specified time in a manner distinguishing it from the other parts in display based on the information acquired by the second acquisition unit and current information on the specified volume; and recovers the specified volume to its state as of at the specified time based on the data backed up in the backup apparatus 600 and the journal data stored in the volume 504 after acquisition of an input instruction via the execution button 319B to recover the specified volume to its state as of at the specified time based on the display.

The present invention can be widely used in various storage systems and storage system management methods.

What is claimed is:

1. A storage system, comprising:
   a host;
   a storage apparatus having plural volumes that store data written from the host and plural volumes that store journal data for the data;
   a management server that manages the storage apparatus; and
   a backup apparatus that backs up the data written to the storage apparatus,
   wherein the management server includes:
   a table that stores, as a change history, at least configuration change and a change time for the plural volumes;
   a management unit that manages the change history stored in the table;
   a first acquisition unit that acquires specification of a recovery-target volume and specification of a recovery time;
   a second acquisition unit that acquires, from the table, information on the specified volume and the specified recovery time after the acquisition of the specification of the recovery-target volume and the specification of the recovery time by the first acquisition unit;
   a display unit that shows a point of difference between the current configuration of the specified volume and the configuration of the specified volume as of at the specified time in a manner distinguishing it from the other parts in display based on the information acquired by the second acquisition unit and current information on the specified volume; and
   a recovery control unit that recovers the specified volume to its state as of at the specified time based on the data backed up in the backup apparatus and the journal data after acquisition of an instruction to recover the specified volume to its state as of at the specified time based on the display of the display unit.

2. The storage system according to claim 1, wherein the specification of the recovery-target volume and the specification of the recovery time, which are acquired by the first acquisition unit, are acquired via a user interface.

3. The storage system according to claim 2, wherein the instruction for recovery based on the display of the display unit is acquired via the user interface.

4. The storage system according to claim 1, wherein the display unit displays a configuration of a volume, which had existed before the recovery time and did not exist at the recovery time, with a faint color compared to a color for the volume configuration as of at the recovery time to show the point of difference in a manner distinguishing it from the other parts in display.

5. The storage system according to claim 1, wherein the specified recovery time is at least either a data recovery time for the specified volume or a configuration recovery time for the specified volume.

6. The storage system according to claim 1, further comprising:
a storage unit that stores current data for the specified volume in a predetermined storage destination after its acquisition of an instruction to store the current data for the specified volume in the recovery of the specified volume by the recovery control unit.

7. The storage system according to claim 1, wherein the volume configuration change is change in a pair configuration.

8. The storage system according to claim 7, wherein any of volumes in the pair configuration is specified regarding the specification of the recovery-target volume.

9. The storage system according to claim 1, wherein plural storage apparatuses are provided besides the storage apparatus, and
wherein the volume configuration change includes change in any of a pair configuration in the storage apparatus, a pair configuration between the storage apparatuses, a cascade configuration, and a hierarchical configuration.

10. The storage system according to claim 1, wherein the management server includes:
a monitoring unit for monitoring a volume configuration in the storage system; and
a notification unit for notifying the monitoring unit of information on change in a pair configuration in the recovery of the specified volume by the recovery control unit.

11. A management method for a storage system including:
a host;
a storage apparatus having plural volumes that store data written from the host and plural volumes that store journal data for the data;
a management server that manages the storage apparatus; and
a backup apparatus that backs up the data written to the storage apparatus, the method comprising:
a step of managing a table that stores, as a change history, at least configuration change and a change time for the plural volumes;
a step of acquiring specification of a recovery-target volume and specification of a recovery time;
a step of acquiring, from the table, information on the specified volume and the specified recovery time after the acquisition of the specification of the recovery-target volume and the specification of the recovery time;
a step of showing a point of difference between a current configuration of the specified volume and a configuration of the specified volume as of at the specified time in a manner distinguishing it from the other parts in display based on the acquired information and current information on the specified volume; and
a step of recovering the specified volume to its state as of at the specified time based on the data backed up in the backup apparatus and the journal data after acquisition of an instruction to recover the specified volume to its state as of at the specified time based on the display.

12. The storage system management method according to claim 11, wherein, in the step of acquiring specification of a recovery-target volume and specification of a recovery time, the specifications are acquired via a user interface.

13. The storage system management method according to claim 12, wherein the instruction for recovery based on the display is acquired via the user interface.

14. The storage system management method according to claim 11, wherein the display shows a configuration of a volume, which had existed before the recovery time and did not exist at the recovery time, with a faint color compared to a color for the volume configuration as of at the recovery time to show the point of difference in a manner distinguishing it from the other parts in display.

15. The storage system management method according to claim 11, wherein the specified recovery time is at least either a data recovery time for the specified volume or a configuration recovery time for the specified volume.

16. The storage system management method according to claim 11, further comprising:
a step of storing current data for the specified volume in a predetermined storage destination after acquisition of an instruction to store the current data for the specified volume in the recovery of the specified volume.

17. The storage system management method according to claim 11, wherein the volume configuration change is change in a pair configuration.

18. The storage system management method according to claim 17, wherein any of volumes in the pair configuration is specified regarding the specification of the recovery-target volume.

19. The storage system management method according to claim 11, wherein plural storage apparatuses are provided besides the storage apparatus; and
wherein the volume configuration change includes change in any of a pair configuration in the storage apparatus, a pair configuration between the storage apparatuses, a cascade configuration, and a hierarchical configuration.

20. The storage system management method according to claim 11, further comprising:
a step of notifying a monitoring unit, which monitors a volume configuration in the storage system, of information on change in a pair configuration in the recovery of the specified volume.

* * * * *